(12) United States Patent
Suzuki

(10) Patent No.: US 9,367,376 B2
(45) Date of Patent: Jun. 14, 2016

(54) DRIVE CONTROL DEVICE

(71) Applicant: Riso Kagaku Corporation, Tokyo (JP)

(72) Inventor: Masao Suzuki, Ibaraki (JP)

(73) Assignee: Riso Kagaku Corporation, Tokyo (JP)

( * ) Notice: Subject to any disclaimer, the term of this patent is extended or adjusted under 35 U.S.C. 154(b) by 154 days.

(21) Appl. No.: 14/242,914

(22) Filed: Apr. 2, 2014

(65) Prior Publication Data
US 2014/0304552 A1 Oct. 9, 2014

(30) Foreign Application Priority Data
Apr. 3, 2013 (JP) ................................. 2013-077515

(51) Int. Cl.
*G06F 11/00* (2006.01)
*G06F 11/07* (2006.01)

(52) U.S. Cl.
CPC ........ *G06F 11/0757* (2013.01); *G06F 11/0736* (2013.01); *G06F 11/0754* (2013.01)

(58) Field of Classification Search
CPC .......................... G06F 11/0754; G06F 11/0757
See application file for complete search history.

(56) References Cited

U.S. PATENT DOCUMENTS

| | | | | |
|---|---|---|---|---|
| 6,182,238 B1 * | 1/2001 | Cooper | ................. | G06F 9/4843 710/266 |
| 2005/0283553 A1 * | 12/2005 | Droba | ................ | G05B 19/0426 710/200 |
| 2006/0053349 A1 * | 3/2006 | Ozawa | ................ | G06F 11/0757 714/55 |
| 2007/0241741 A1 * | 10/2007 | Pirozzi | ............... | G01D 5/24404 324/160 |
| 2012/0198464 A1 * | 8/2012 | Taira | ........................ | G05B 9/02 718/103 |
| 2014/0108836 A1 * | 4/2014 | Nishijima | ............. | G06F 1/3275 713/320 |
| 2015/0089269 A1 * | 3/2015 | Takata | ................... | G06F 1/025 713/500 |

FOREIGN PATENT DOCUMENTS

| | | |
|---|---|---|
| JP | 61-005504 A | 1/1986 |
| JP | 2009-042595 A | 2/2009 |
| JP | 2009-093014 A | 4/2009 |

* cited by examiner

*Primary Examiner* — Charles Ehne
(74) *Attorney, Agent, or Firm* — Studebaker & Brackett PC

(57) ABSTRACT

A drive control device includes: an embedded microcontroller including a program for outputting a drive control signal to a driving unit; a first timer circuit for outputting a cyclic signal to the embedded microcontroller, wherein the embedded microcontroller reads the cyclic signal outputted from the first timer circuit and transmits the cyclic signal to output a transmission signal as part of operation of the program; and a second timer circuit provided externally to the embedded microcontroller, wherein the transmission signal is inputted to the second timer circuit, the second timer circuit obtains temporal change of the transmission signal for a time set in advance, and the second timer circuit outputs, based on the obtained result, a signal indicating one of different operation states of the embedded microcontroller depending on whether or not there is continuous temporal change of the transmission signal.

7 Claims, 22 Drawing Sheets

DRIVE CONTROL DEVICE

BACKGROUND OF THE INVENTION

1. Field of the Invention

The present invention relates to a drive control device including an embedded microcontroller that includes a program for outputting a drive control signal to a driving unit that drives a given apparatus.

2. Description of the Related Art

In recent years, in order to control movement of a given mechanical section using an actuator including a driving unit, such as a motor, an embedded microcontroller, such as a CPU (Central Processing Unit) or a DSP (Digital Signal Processor), including a program for drive control of the actuator is often used.

Specifically, for example, Japanese Unexamined Patent Publication No. S61 (1986)-5504 (hereinafter, Patent Document 1) proposes using an embedded microcontroller to control an electromagnet mechanism to achieve switching between red and black ink ribbons of a serial printer. Each of Japanese Unexamined Patent Publication Nos. 2009-93014 and 2009-42595 (hereinafter, Patent Documents 2 and 3, respectively) proposes an electrographic color printer wherein an embedded microcontroller is used to perform temperature control of a fixing heater that is provided in a fixing roller for fixing toner.

SUMMARY OF THE INVENTION

However, during development of a program of an embedded microcontroller, such as those described above, a situation where operation of the program has to be suspended for the purpose of debug often occurs. In such a situation, if the operation is suspended in a state where electricity is applied to the actuator, damage due to a mechanical section being locked and/or abnormal heating due to application of excessive electricity may occur.

Further, with respect to embedded microcontrollers, a failure of the program called "hidden bug" may occur, which is a factor of malfunction that may hinder normal operation of the program in not a few cases. The above-described locked mechanical section and/or abnormal heating may also occur due to such abnormal operation of the program.

More specifically, for example, if the suspension or abnormal operation of the program, as described above, occurs in a feedback loop-type motor rotational speed control system that performs so-called PID control, as shown in FIG. 22, the feedback loop is not established and the rotational speed of the motor becomes inconstant, and a PWM drive control signal immediately before the suspension of the program, for example, may be continuously outputted. In the case where the rotational speed of the motor becomes inconstant, paper jam may occur in a paper transport system, or gear tooth chipping, belt breakage, shaft bending, etc., may occur due to a mechanism system being locked, for example. In some cases, the power system device may be damaged due to the motor being locked.

If the suspension or abnormal operation of the program, as described above, occurs in a drive control system that makes a reciprocating motion within a limit position range, as shown in FIG. 23, the drive control system may not be able to perform recovery operation by itself after recovery of the program to normal operation due to the mechanism system being locked. In some cases, the user may be injured or the power system device may be damaged due to the motor being locked, as described above.

In a control system that performs open-loop constant current control of a solenoid and a DC motor, as shown in FIG. 24, winding may burn out. In a control system that performs dynamic scanning display drive, as shown in FIG. 25, a display device or a digit-side switch device may deteriorate.

In a control system that performs temperature control of a heater or a heat radiator, abnormal heating may occur. In a control system that controls a pump for pumping a liquid, such as ink, leakage of the liquid or insulation failure of an electrical system due to overflow may be induced.

Patent Document 1 proposes, with respect to a control system that supply an excitation current to an electromagnet mechanism at a specified time interval that is set in advance, a method for ensuring safety by mandatorily providing a configuration where the excitation current can be supplied only at the specified time interval even when a control signal that causes the excitation current to be supplied at a shorter interval than the specified time interval is outputted due to abnormal operation of the program, as described above.

With the method disclosed in Patent Document 1, however, when the specified time interval set in the program is changed, for example, the safety control cannot be achieved with high accuracy unless a timer circuit for measuring the specified time is changed.

Each of Patent Documents 2 and 3 proposes a method that involves: causing an embedded microcontroller to output a pulse signal at a predetermined cycle; detecting a state where the pulse signal is maintained at a low level or a high level for a predetermined time period due to abnormal operation of a program, as described above; and outputting a mandatory suspension signal to a fixing heater in response to the result of the detection.

With the methods disclosed in Patent Documents 2 and 3, however, the pulse signal is outputted from the embedded microcontroller. Therefore, if the program of the embedded microcontroller is changed to change the cycle of the pulse signal, the safety control cannot be achieved with high accuracy unless a timer circuit for measuring duration of the low level state and of the high level state is changed.

A method for detecting abnormal operation of a main program of an embedded microcontroller by executing an interrupt processing program in response to a timing signal outputted from a timer circuit at a predetermined interval may be contemplated. However, in this case, the interrupt processing may be established even when the operation of the main program is abnormal, and therefore this method is not an appropriate method.

In view of the above-described circumstances, the present invention is directed to providing a drive control device that is able to ensure safety by appropriately suspending a driving unit in the event of abnormal operation of a program included in an embedded microcontroller or when the program is suspended for the purpose of debug of the program.

An aspect of the drive control device of the invention includes: an embedded microcontroller including a program for outputting a drive control signal to a driving unit that drives a given apparatus; a first timer circuit provided externally to the embedded microcontroller, the first timer circuit outputting a cyclic signal to the embedded microcontroller, wherein the embedded microcontroller reads the cyclic signal outputted from the first timer circuit and transmits the cyclic signal to output a transmission signal as part of operation of the program; and a second timer circuit provided externally to the embedded microcontroller, wherein the transmission signal is inputted to the second timer circuit, the second timer circuit obtains temporal change of the transmission signal for a time set in advance, and the second timer circuit outputs, based on the obtained result, a signal indicating one of different operation states of the embedded microcontroller depending on whether or not there is continuous temporal change of the transmission signal.

In the above-described drive control device of the invention, the first timer circuit may include a rectangular wave oscillator and may output a rectangular wave signal that is outputted from the rectangular wave oscillator as the cyclic signal, and the embedded microcontroller may output the transmission signal by providing a toggled output of the cyclic signal that is the rectangular wave signal as part of operation of the program.

A cycle T1 of the cyclic signal outputted from the first timer circuit and the time set in advance T2 at the second timer circuit may be set to satisfy the relationship T2>T1.

The first timer circuit may output, as the cyclic signal, a signal of a given logic level for a time t1 from a point of time at which a trigger signal is inputted, the embedded microcontroller may measure the time t1 from a start of reading of the cyclic signal with a counter, and, at a point of time at which a counter number resulting from the measurement has been counted after elapse of the time t1, the embedded microcontroller may output, as the transmission signal, a signal of a given logic level to the second timer circuit and may output the signal of the given logic level as the trigger signal to the first timer circuit as part of operation of the program. The time t1 for which the signal of the given logic level is outputted from the first timer circuit and the time set in advance t2 at the second timer circuit may be set to satisfy the relationship t2>2×t1.

The embedded microcontroller may read the cyclic signal by performing a polling operation as part of operation of the program.

The embedded microcontroller may include, separately from said program, an abnormality detection program for detecting abnormal operation of the driving unit, and, if abnormal operation is detected by the abnormality detection program, the embedded microcontroller may output, to the second timer circuit, a signal that maintains an input state of the second timer circuit.

According to the drive control device of the invention, the first timer circuit provided externally to the embedded microcontroller outputs a cyclic signal to the embedded microcontroller, the embedded microcontroller reads the cyclic signal outputted from the first timer circuit and outputs the transmission signal to the second timer circuit provided externally to the embedded microcontroller as part of operation of the program, the second timer circuit obtains temporal change of the transmission signal for a time set in advance, and the second timer circuit outputs, based on the obtained result, a signal indicating one of different operation states of the embedded microcontroller depending on whether or not there is continuous temporal change of the transmission signal. Therefore, abnormal operation or suspension of the program of the embedded microcontroller can be detected by the first and the second timer circuit that are provided externally to the embedded microcontroller.

Then, based on the result of the detection, the drive control circuit that is provided separately from the embedded microcontroller suspends operation of the driving unit, thereby ensuring safety. By compensating for and detecting a software failure of the embedded microcontroller by using another path in this manner, a multiple safety ensuring function can be provided.

Further, in the drive control device of the invention, all protective functions, failures of which are detectable by a software approach, can be compensated for and the failures thereof can be detected by using another path. Therefore, a multiple safety ensuring function can be provided with a simple, low cost and feasible configuration, without providing a separate system of the protective functions as in prior art.

Further, in a case where operation of the program of the embedded microcontroller has to be frequently suspended for the purpose of debug of the program, as described above, it is very inefficient to perform an operation to bring the driving unit into a safe state every time the program is suspended. According to the drive control device of the invention, the driving unit can appropriately be suspended in response to suspension of the program without such an operation, and operation of the driving unit can be started with no problem when the program is restarted. Thus, a highly efficient program development environment can be provided.

Further, in the drive control device of the invention, temporal change of the transmission signal, which is the cyclic signal outputted from the first timer circuit and transmitted by the embedded microcontroller, is detected by the second timer circuit to detect abnormal operation of the program. Therefore, accuracy of detection of abnormal operation of the program is not significantly influenced by a change of the program, unlike the methods disclosed in Patent Documents 1 to 3.

Further, in the drive control device of the invention, abnormal operation of the program is detected by part of operation of the program. Therefore, there is no such a situation that the state of operation of the program is incorrectly detected as normal, unlike the above-described case where abnormal operation is detected by interrupt processing.

DESCRIPTION OF THE PREFERRED EMBODIMENTS

Figure 1:
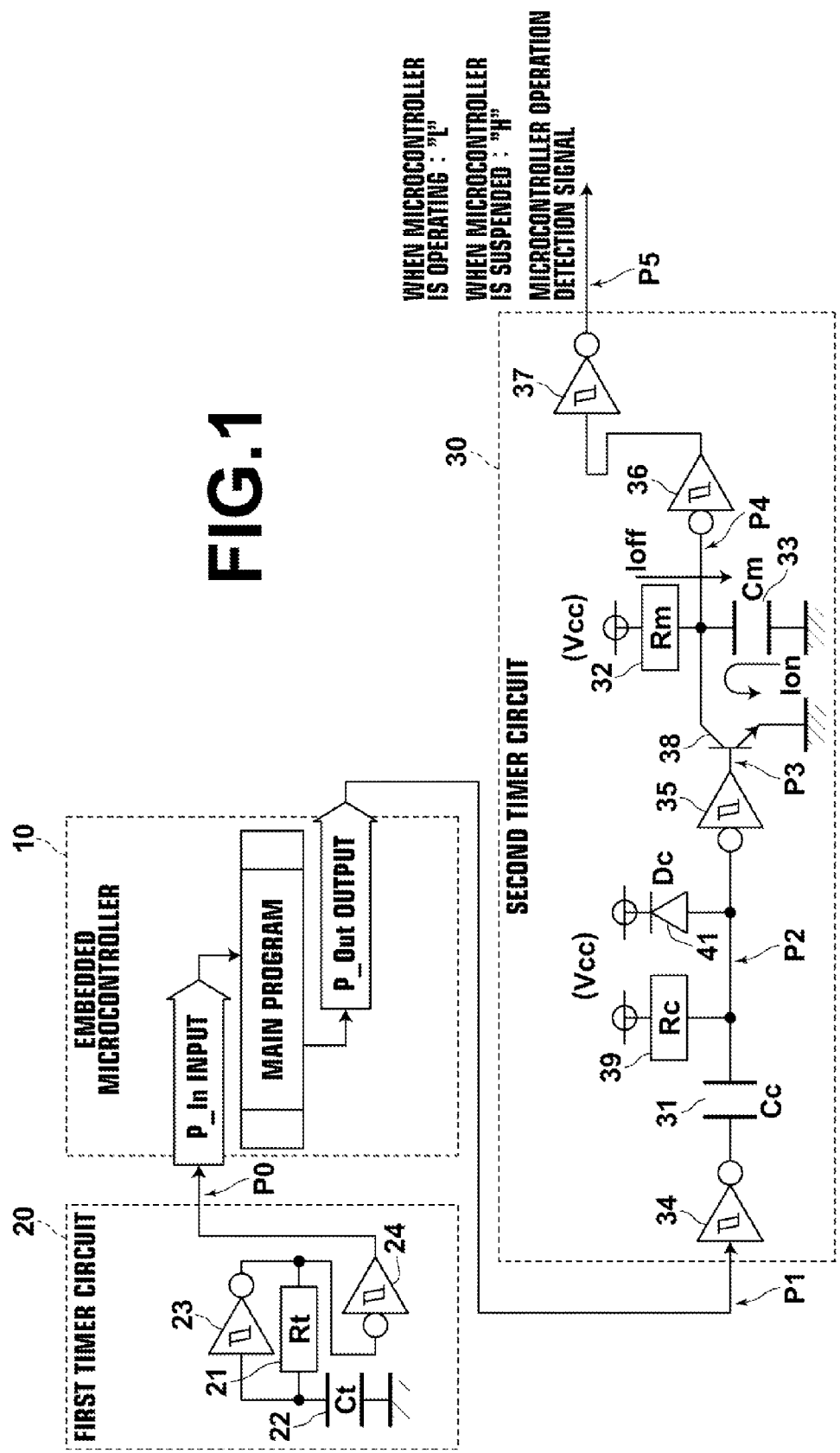
FIG. 1 is a diagram illustrating the schematic configuration of a first embodiment of a drive control device of the present invention.

Hereinafter, a first embodiment of a drive control device of the present invention will be described in detail with reference to the drawings. The drive control device of this embodiment includes an embedded microcontroller, which outputs a drive control signal to a driving unit that drives an apparatus having a mechanical mechanism, a display device, or the like. In particular, the drive control device is adapted to be able to ensure safety in the event of abnormal operation of a program included in the embedded microcontroller. FIG. 1 is a block diagram illustrating the schematic configuration of the entire drive control device of this embodiment.

As shown in FIG. 1, the drive control device of this embodiment includes an embedded microcontroller 10, a first timer circuit 20 and a second timer circuit 30.

The embedded microcontroller 10 is formed, for example, by a CPU (Central Processing Unit) or a DSP (Digital Signal Processor), and includes a main program for outputting a drive control signal to a driving unit, such as a motor.

The embedded microcontroller 10 includes an input port P_In and an output port P_Out. The input port P_In is connected to the first timer circuit 20 and receives a cyclic signal, which will be described later, outputted from the first timer circuit 20.

The main program included in the embedded microcontroller 10 performs a polling operation as part of operation thereof. The polling operation in this embodiment is an operation including reading a cyclic signal inputted to the input port P_In, and outputs a transmission signal that is a toggled output of the cyclic signal. Namely, in this embodiment, an inverted signal of the cyclic signal is outputted as the transmission signal from the output port P_Out by the polling operation.

The output port P_Out is connected to the second timer circuit 30, and outputs the transmission signal, which is generated by the above-described polling operation, to the second timer circuit 30.

The first timer circuit 20 is a rectangular wave oscillator including a resistor element 21, a capacitor 22 and two Schmitt trigger inverters 23 and 24, and outputs a rectangular wave signal as the above-described cyclic signal. A cycle T1 of the cyclic signal is set based on a resistance value Rt of the resistor element 21 and a capacitance value Ct of the capacitor 22, where T1 is proportional to Rt·Ct.

The second timer circuit 30 includes: a capacitor 31 and a resistor element 39 forming a differentiating circuit; an input protection diode 41; a transistor 38; a capacitor 33 and a resistor element 32 forming an integrating circuit; and four Schmitt trigger inverters 34, 35, 36 and 37. A transmission signal outputted from the output port P_Out of the embedded microcontroller 10 is inputted to the second timer circuit 30, and the second timer circuit 30 obtains temporal change of the transmission signal for a time set in advance. The time set in advance T2 is set based on a resistance value Rm of the resistor element 32 and a capacitance value Cm of the capacitor 33, where T2 is proportional to Rm·Cm. Further, the time T2 and the cycle T1 of the cyclic signal outputted from the first timer circuit 20 are set to satisfy the relationship T2>T1. The reason of this will be described in detail later.

Based on the obtained temporal change of the transmission signal, the second timer circuit 30 outputs a signal (microcontroller operation detection signal) that indicates one of different operation states of the embedded microcontroller 10 depending on whether or not there is continuous temporal change of the transmission signal. Specifically, if there is continuous temporal change of the transmission signal, that is, if the transmission signal corresponds to the cyclic signal outputted from the first timer circuit 20, it is determined that the operation of the main program of the embedded microcontroller 10 is normal, and the second timer circuit 30 of this embodiment outputs a L (low) signal. On the other hand, if there is no continuous temporal change of the transmission signal, that is, if the transmission signal does not corresponds to the cyclic signal, it is determined that the operation of the main program of the embedded microcontroller 10 is not normal, and the second timer circuit 30 of this embodiment outputs a H (high) signal. Operation of the second timer circuit 30 will be described in detail later.

The L signal or H signal outputted from the second timer circuit 30 is outputted to a drive control circuit (not shown in FIG. 1), which is provided separately from the embedded microcontroller 10. When the H signal is inputted to this drive control circuit, the drive control circuit suspends operation of the driving unit. The drive control circuit will be described in detail later.

Figure 2:
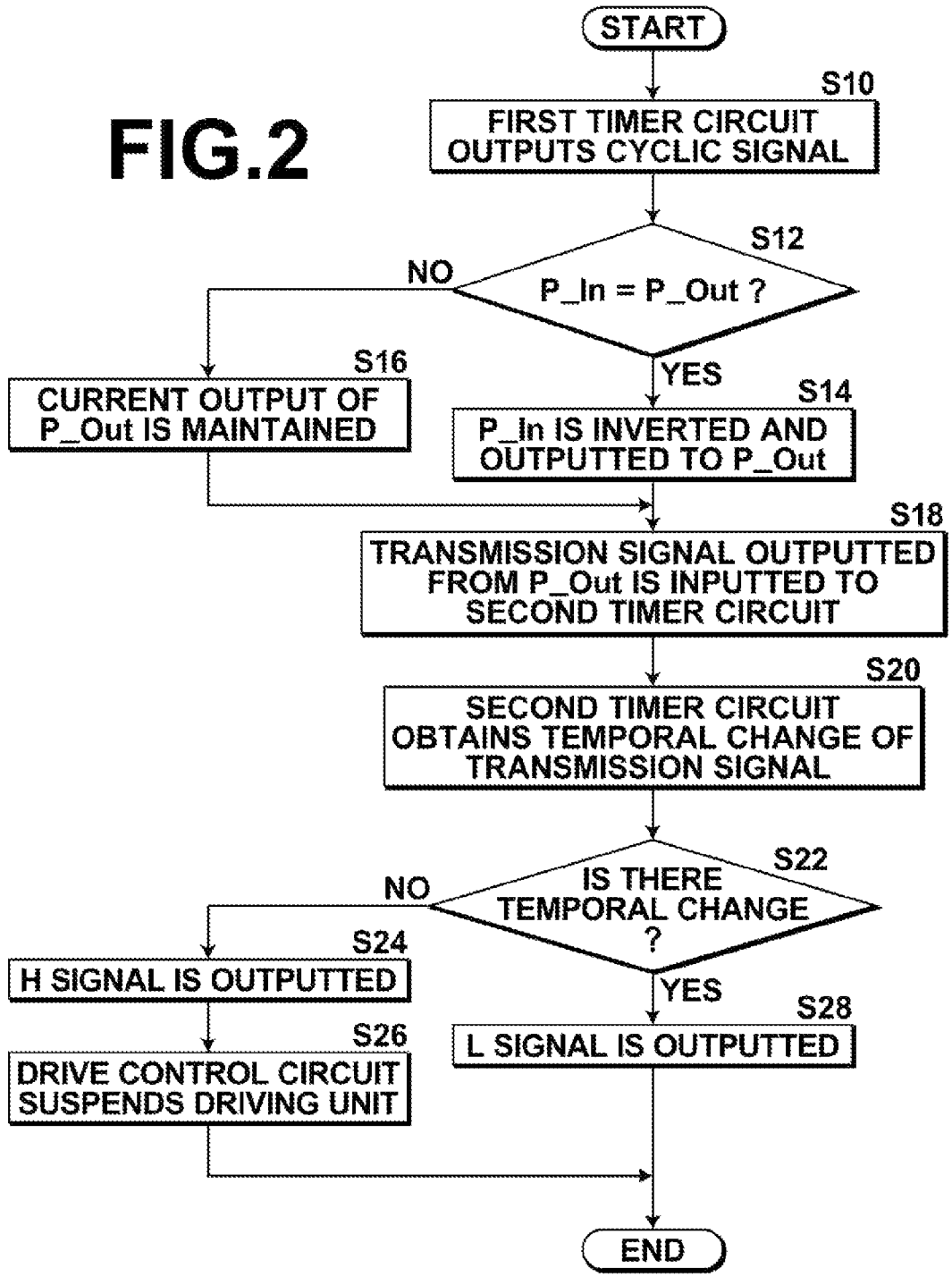
FIG. 2 is a flow chart for explaining operation of the first embodiment of the drive control device of the invention.

Next, operation of the drive control device of this embodiment is described with reference to the flow chart shown in FIG. 2. The drive control device of this embodiment is characterized by detection of abnormal operation of the main program of the embedded microcontroller 10, and this point is mainly explained in the following description.

Figure 3:
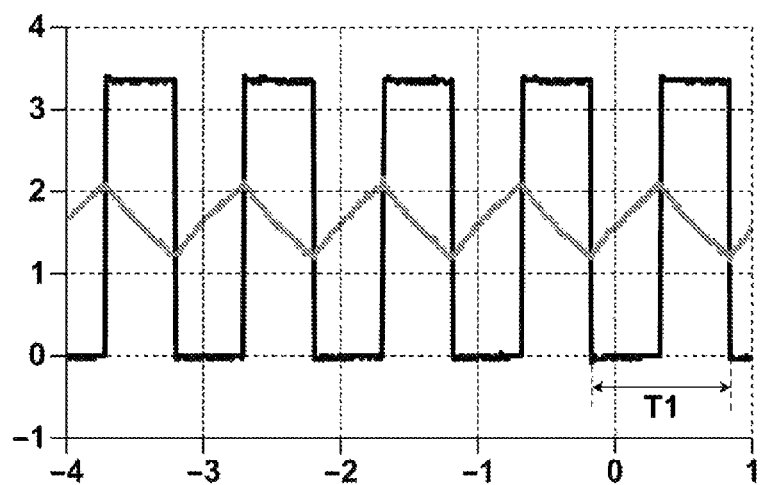
FIG. 3 is a diagram illustrating one example of a rectangular wave signal outputted from a first timer circuit.

First, the first timer circuit 20 generates a triangular wave signal of the cycle T1, as shown in FIG. 3, and the triangular wave signal is converted into a rectangular wave by the Schmitt trigger inverters 21 and 24. This rectangular wave signal is outputted as the cyclic signal (S10). The cyclic signal is outputted to the input port P_In of the embedded microcontroller 10 regardless of the operation of the main program of the embedded microcontroller 10.

Then, the embedded microcontroller 10 performs the polling operation as part of operation of the main program. In the polling operation, an input state of the cyclic signal inputted to the input port P_In of the embedded microcontroller 10 is compared with an output state of the output port P_Out at a predetermined polling cycle (S12). The polling cycle is sufficiently shorter than the cycle T1 of the cyclic signal. The output state of the output port P_Out to be compared is an output state based on the previous result of comparison.

If the input state of the input port P_In is the same as the output state of the output port P_Out, a toggled output is provided (S14). Namely, if the state of the input port P_In is the L (low) state and the state of the output port P_Out is also the L (low) state, a H (high) signal, which is an inverted signal of the signal at the input port P_In, is outputted to the output port P_Out. Also, if the state of the input port P_In is the H (high) state and the state of the output port P_Out is also the H (high) state, a L (low) signal, which is an inverted signal of the signal at the input port P_In, is outputted to the output port P_Out.

On the other hand, if the input state of the input port P_In is different from the output state of the output port P_Out, the current output state of the output port P_Out is maintained (S16).

Figure 4:
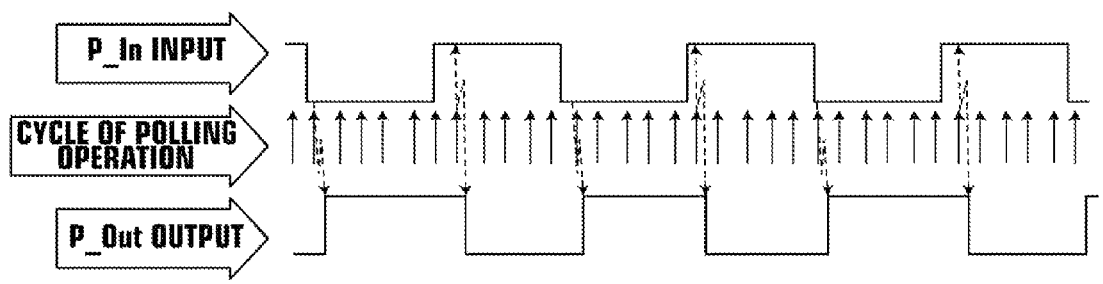
FIG. 4 is a diagram illustrating a relationship among a waveform of a signal inputted to an input port, a waveform of a signal outputted from an output port, and a cycle of a polling operation of an embedded microcontroller of the first embodiment.

By performing the polling operation in this manner, the transmission signal, which is the inverted signal of the cyclic signal, as shown in FIG. 4, is outputted from the output port P_Out. It should be noted that the arrows in solid line shown in FIG. 4 indicate the cycle of the polling operation, and the arrows in dashed line indicate timing of the inverted output by the polling operation.

The transmission signal outputted from the output port P_Out of the embedded microcontroller 10 is inputted to the second timer circuit 30 (S18). Then, the second timer circuit 30 obtains temporal change of the transmission signal for the time set in advance T2 (S20). Now, operation of the second timer circuit 30 is described in detail. In the following description, the output state of the second timer circuit 30 when operation of the main program of the embedded microcontroller 10 changes from a normal state to an abnormal state is specifically described. A signal waveform at P0 shown in FIG. 1 is shown at "a" in FIG. 5, a signal waveform at P1 shown in FIG. 1 is shown at "b" in FIG. 5, a signal waveform at P2 shown in FIG. 1 is shown at "c" in FIG. 5, a signal waveform at P3 shown in FIG. 1 is shown at "d" in FIG. 5, a signal waveform at P4 shown in FIG. 1 is shown at "e" in FIG. 5, and a signal waveform at P5 shown in FIG. 1 is shown at "f" in FIG. 5.

Figure 5:
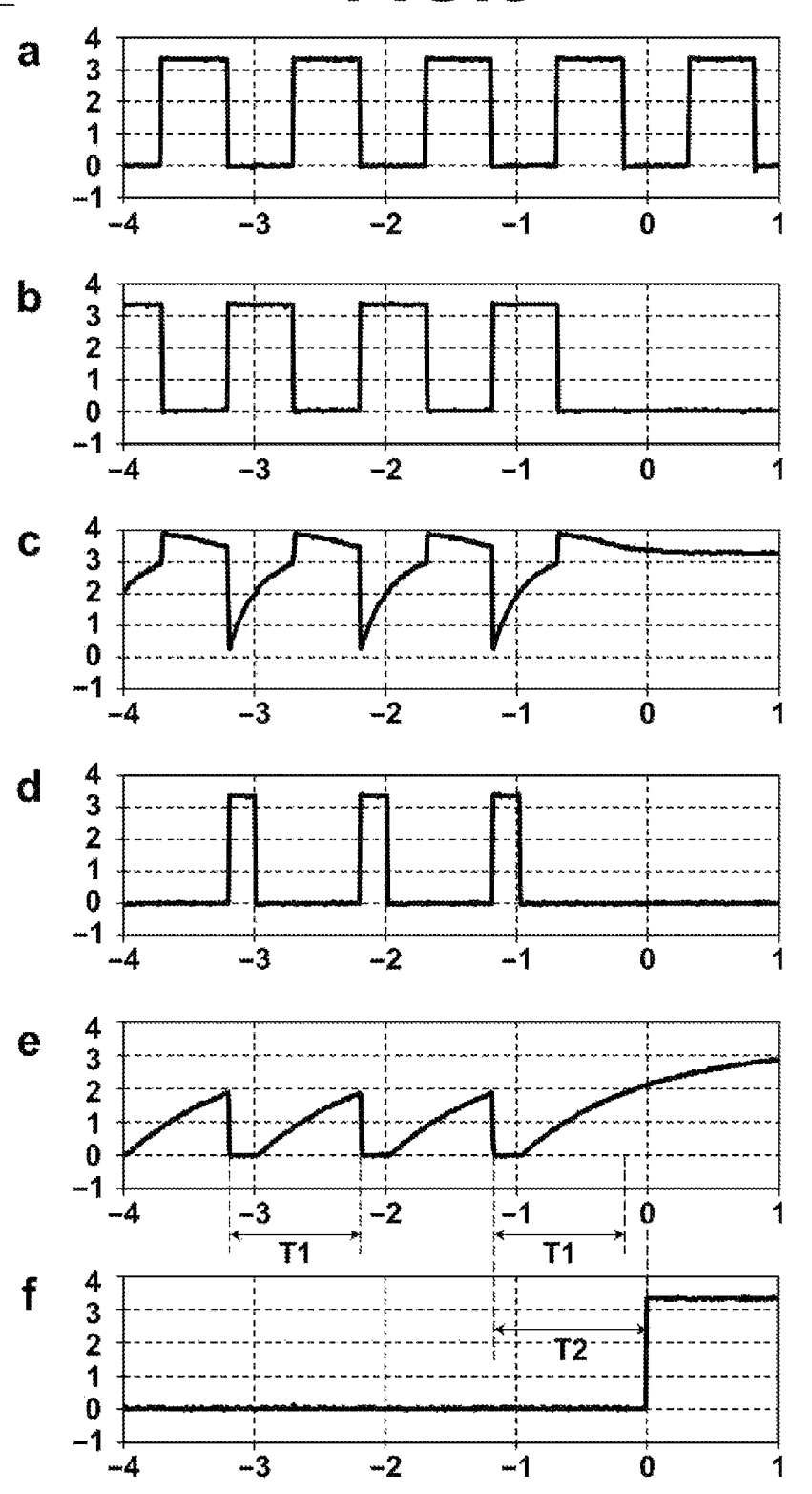
FIG. 5 illustrates one example of signal waveforms when a transmission signal is maintained in a L (low) signal state due to abnormal operation of a main program in the drive control device of the first embodiment.

First, the cyclic signal, as shown at "a" in FIG. 5, is inputted to the embedded microcontroller 10. While the operation of the embedded microcontroller 10 is normal, the transmission signal, which is a rectangular wave signal as shown at "b" in FIG. 5, is outputted from the output port P_Out of the embedded microcontroller 10. As the transmission signal, which is the rectangular wave signal as shown at "b" in FIG. 5, is inputted to the second timer circuit 30, the signal is inverted by the Schmitt trigger inverter 34, and is differentiated by the differentiating circuit formed by the capacitor 31 and the resistor element 39 to be a signal having the waveform as shown at "c" in FIG. 5 at P2 shown in FIG. 1.

Then, the signal is inverted and converted by the Schmitt trigger inverter 35 into a rectangular wave to be a signal having the waveform as shown at "d" in FIG. 5 at P3 shown in FIG. 1. While the rectangular wave signal shown at "d" in FIG. 5 is in the H (high) state, the transistor 38 is turned on and an electric charge in the capacitor 33 is discharged by an electric current Ion. As a result, the signal at P4 shown in FIG. 1 is a L (low) signal as shown at "e" in FIG. 5. On the other hand, while the rectangular wave signal shown at "d" in FIG. 5 is in the L (low) state, the transistor 38 is turned off, and the capacitor 33 is charged with an electric current Ioff. As a result, at P4 shown in FIG. 1, an integral signal as shown at "e" in FIG. 5 is outputted. A time constant of the integrating circuit that outputs the integral signal at this time is a product of the resistance value Rm of the resistor element 32 and the capacitance value Cm of the capacitor 33. That is, a value that is proportional to the time constant of the integrating circuit is the time T2 for which the temporal change of the transmission signal is measured. The second timer circuit 30 obtains temporal change of the transmission signal, i.e., temporal change of the integral signal shown at "e" in FIG. 5, for the time T2.

It should be noted that, since the second timer circuit 30 obtains the temporal change of the transmission signal that is an inverted signal of the cyclic signal, as described above, the second timer circuit 30 measures the time T2 that is longer than at least the cycle T1 of the cyclic signal and obtains the temporal change of the transmission signal for the time T2. That is, the cycle T1 of the cyclic signal and the time T2 need to satisfy the relationship T2>T1, as mentioned above.

While the operation of the embedded microcontroller 10 is normal and the transmission signal of the cycle T1 is inputted to the second timer circuit 30, the integral signal outputted from the integrating circuit returns to a ground voltage at the cycle T1, as shown at "e" in FIG. 5. Therefore, the voltage at P4 shown in FIG. 1 does not exceed a threshold voltage of the Schmitt trigger inverter 36, and a L (low) signal as shown at "f" in FIG. 5 is maintained at P5 shown in FIG. 1.

In this manner, the second timer circuit 30 obtains the temporal change of the integral signal for the time T2, and if there is continuous temporal change, the second timer circuit 30 outputs the L (low) signal (S22: YES, and S28). That is, when the operation of the main program of the embedded microcontroller 10 is normal and an appropriate transmission signal corresponding to the cyclic signal outputted from the first timer circuit 20 is outputted from the output port P_Out, the second timer circuit 30 outputs the L (low) signal.

On the other hand, if the operation of the main program of the embedded microcontroller 10 is not normal, the embedded microcontroller 10 does not output an appropriate transmission signal. Specifically, the above-described polling operation is not performed, and the transmission signal outputted from the output port P_Out of the embedded microcontroller 10 remains the H (high) signal or the L (low) signal, i.e., there is no continuous temporal change. Now, operation of the second timer circuit 30 when the transmission signal outputted from the output port P_Out of the embedded microcontroller 10 remains the L (low) signal, as shown at "b" in FIG. 5, is described.

First, as a L (low) signal is inputted to the second timer circuit 30, the L (low) signal is inverted by the first Schmitt trigger inverter 34, and then is inverted by the next Schmitt trigger 35 again into a L (low) signal.

Then, at P3 shown in FIG. 1, the signal is maintained in the L (low) state and the transistor 38 remains in the off state, so that the capacitor 33 is continuously charged with the electric current Ioff. As a result, the voltage at P4 shown in FIG. 1 increases, as shown at "e" in FIG. 5. After the increasing voltage at P4 shown in FIG. 1 exceeds the threshold voltage of the Schmitt trigger inverter 36, a H (high) signal is maintained at P5 shown in FIG. 1.

That is, when the operation of the main program of the embedded microcontroller 10 is not normal and the L (low) signal inputted from the output port P_Out of the embedded microcontroller 10 to the second timer circuit 30 is maintained without temporal change, the second timer circuit 30 outputs the H (high) signal (S22: NO, and S24).

Figure 6:
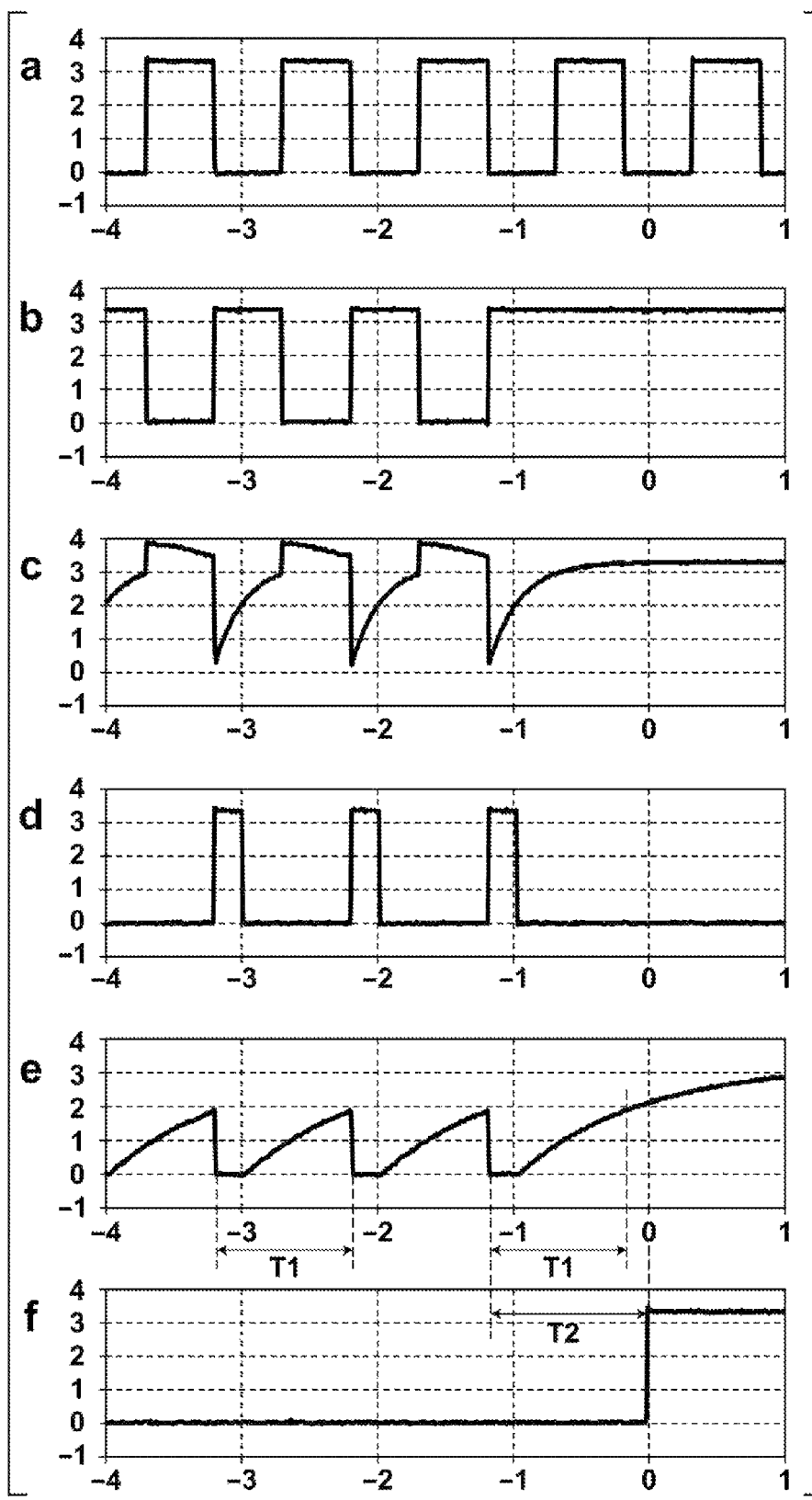
FIG. 6 illustrates one example of signal waveforms when the transmission signal is maintained in a H (high) signal state due to abnormal operation of the main program in the drive control device of the first embodiment.

Next, operation of the second timer circuit 30 when the transmission signal outputted from the output port P_Out of the embedded microcontroller 10 remains the H (high) signal is described. A signal waveform at P0 shown in FIG. 1 is shown at "a" in FIG. 6, a signal waveform at P1 shown in FIG. 1 is shown at "b" in FIG. 6, a signal waveform at P2 shown in FIG. 1 is shown at "c" in FIG. 6, a signal waveform at P3 shown in FIG. 1 is shown at "d" in FIG. 6, a signal waveform at P4 shown in FIG. 1 is shown at "e" in FIG. 6, and a signal waveform at P5 shown in FIG. 1 is shown at "f" in FIG. 6.

The capacitor 31 shown in FIG. 1 is a DC cut capacitor. Therefore, when the H (high) signal is continuously inputted to the second timer circuit 30 without temporal change, as shown at "b" in FIG. 6, i.e., when there is no AC component, the signal at P3 shown in FIG. 1 is maintained in the L (low) state, which is the same state as that when the L (low) signal is inputted to the second timer circuit 30 without temporal change.

Therefore, when the operation of the main program of the embedded microcontroller 10 is not normal and the H (high) signal inputted from the output port P_Out of the embedded microcontroller 10 to the second timer circuit 30 is maintained without temporal change, the second timer circuit 30 outputs the H (high) signal (S22: NO, and S24).

That is, when the operation of the main the program of the embedded microcontroller 10 is normal, the second timer circuit 30 outputs the L (low) signal, and when the operation of the main the program of the embedded microcontroller 10 is not normal, the second timer circuit 30 outputs the H (high) signal.

Then, the H signal outputted from the second timer circuit 30 is outputted to the drive control circuit, which is provided separately from the embedded microcontroller 10. When the H signal is inputted to the drive control circuit, the drive control circuit suspends operation of the driving unit (S26).

Figure 7:
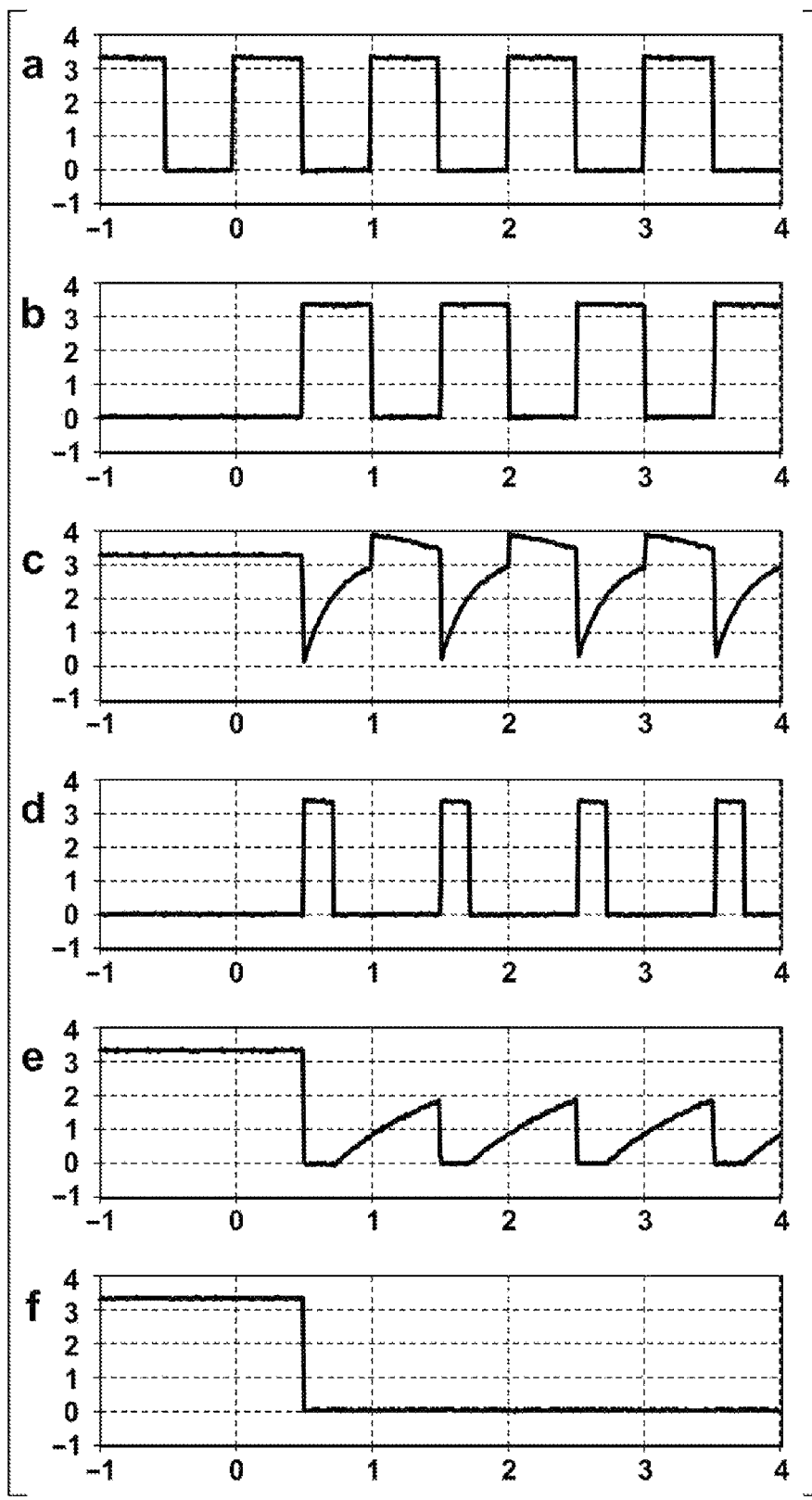
FIG. 7 illustrates one example of signal waveforms when the main program is recovered from a suspended state in the drive control device of the first embodiment.

FIG. 7 shows, at "a" to "f", signal waveforms at P0 to P5 shown in FIG. 1 in a case where the main program of the embedded microcontroller 10 is mandatorily suspended for the purpose of debug and the transmission signal is maintained in the L signal state, and then the main program is recovered to the normal operation. Specifically, a signal waveform (a waveform of the cyclic signal) at P0 shown in FIG. 1 is shown at "a" in FIG. 7, a signal waveform (a waveform of the transmission signal) at P1 shown in FIG. 1 is shown at "b" in FIG. 7, a signal waveform at P2 shown in FIG. 1 is shown at "c" in FIG. 7, a signal waveform at P3 shown in FIG. 1 is shown at "d" in FIG. 7, a signal waveform at P4 shown in FIG. 1 is shown at "e" in FIG. 7, and a signal waveform at P5 shown in FIG. 1 is shown at "f" in FIG. 7. The operation of the second timer circuit 30 in this case is the same as that described above, and the explanation thereof is omitted.

Figure 8:
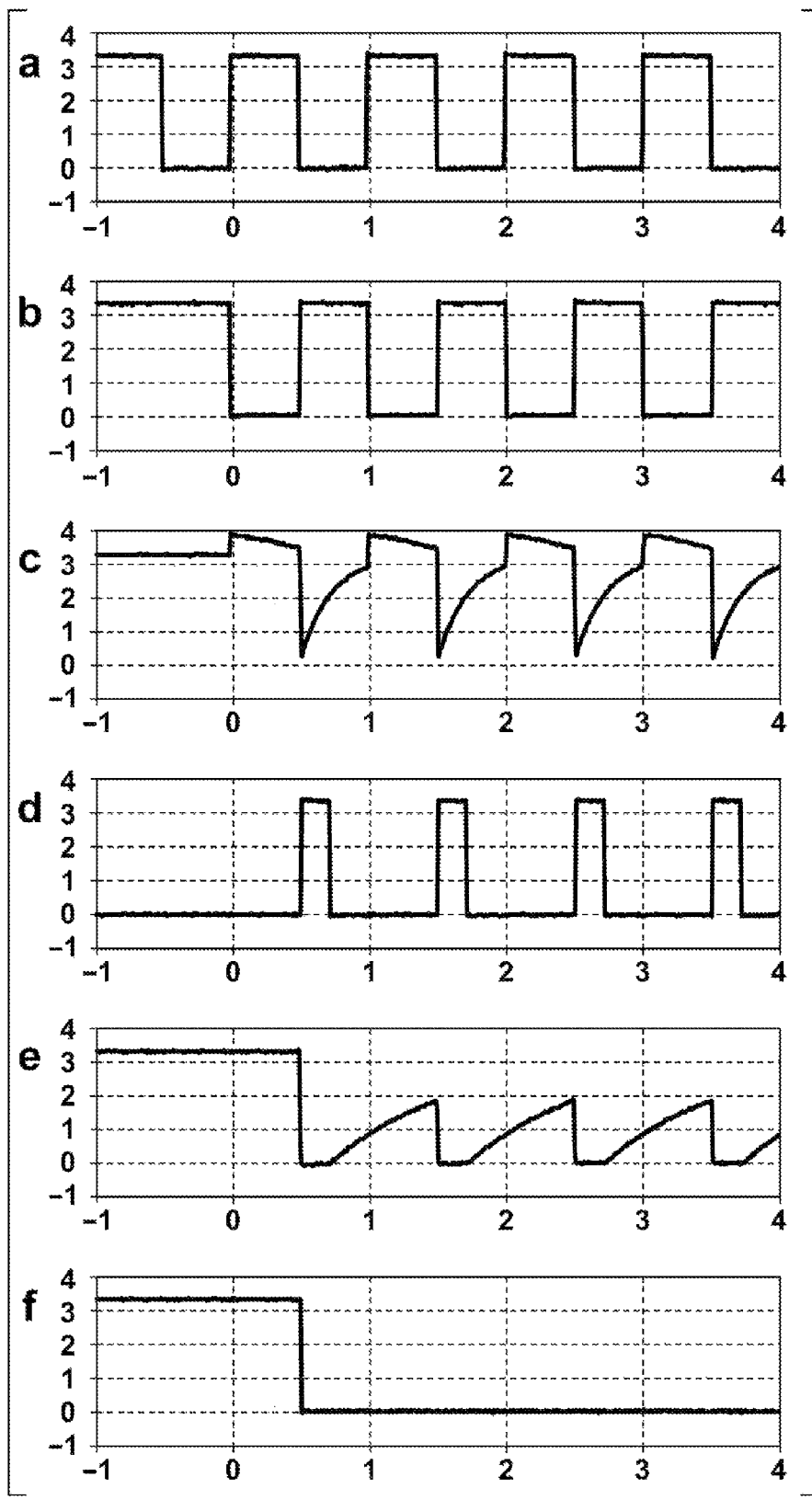
FIG. 8 illustrates one example of signal waveforms when the main program is recovered from a suspended state in the drive control device of the first embodiment.

FIG. 8 shows, at "a" to "f", signal waveforms at P0 to P5 shown in FIG. 1 in a case where the main program of the embedded microcontroller 10 is mandatorily suspended for the purpose of debug and the transmission signal is maintained in the H signal state, and then the main program is recovered to the normal operation. Specifically, a signal waveform (a waveform of the cyclic signal) at P0 shown in FIG. 1 is shown at "a" in FIG. 8, a signal waveform (a waveform of the transmission signal) at P1 shown in FIG. 1 is shown at "b" in FIG. 8, a signal waveform at P2 shown in FIG. 1 is shown at "c" in FIG. 8, a signal waveform at P3 shown in FIG. 1 is shown at "d" in FIG. 8, a signal waveform at P4 shown in FIG. 1 is shown at "e" in FIG. 8, and a signal waveform at P5 shown in FIG. 1 is shown at "f" in FIG. 8. The operation of the second timer circuit 30 in this case is also the same as that described above, and the explanation thereof is omitted.

Figure 9:
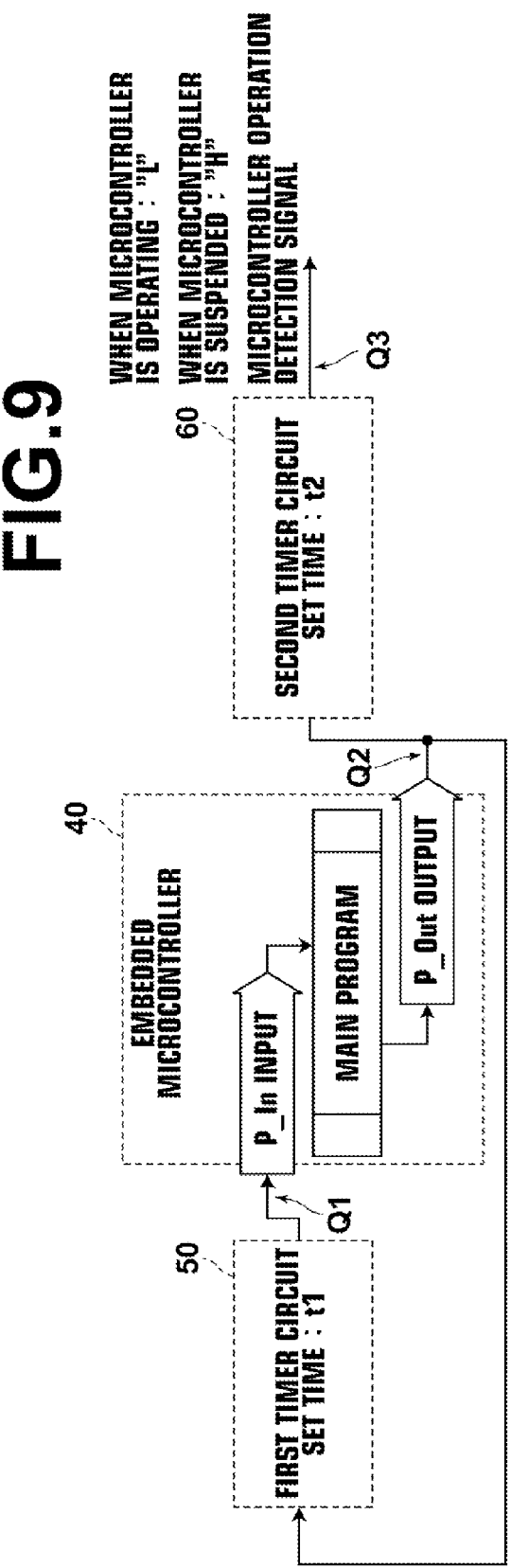
FIG. 9 is a diagram illustrating the schematic configuration of a second embodiment of the drive control device of the invention.

Next, a second embodiment of the drive control circuit of the invention is described. FIG. 9 is a block diagram illustrating the schematic configuration of the entire drive control device of the second embodiment.

As shown in FIG. 9, the drive control device of the second embodiment includes an embedded microcontroller 40, a first timer circuit 50, and a second timer circuit 60.

Each of the first timer circuit 50 and the second timer circuit 60 of this embodiment is formed by a retriggerable monostable multivibrator and their function is equivalent to that of the second timer circuit 30 of the above-described first embodiment. Namely, similarly to the second timer circuit 30 of the first embodiment, the first timer circuit 50 and the second timer circuit 60 provide an inverted output when no trigger is fed thereto for a given length of time, and the output state does not change until the trigger is restarted.

Figure 10:
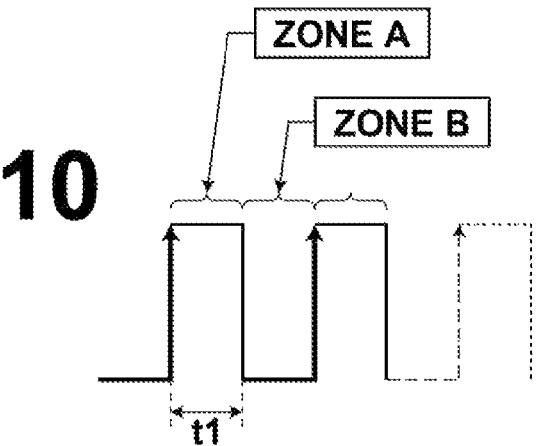
FIG. 10 is a diagram illustrating one example of a cyclic signal outputted from a first timer circuit and a transmission signal outputted from an embedded microcontroller of the second embodiment.

Similarly to the first timer circuit 20 of the first embodiment, the first timer circuit 50 outputs a cyclic signal; however, the content of the cyclic signal is different. The first timer circuit 50 of the second embodiment outputs only a signal corresponding to a half cycle of a cyclic signal of one cycle. Specifically, the first timer circuit 50 outputs a H (high) signal for a time t1 set in advance after the trigger is inputted, and then provide an inverted output after the time t1 has elapsed. Namely, the first timer circuit 50 substantially outputs a cyclic signal that is formed by each part corresponding to a half cycle in the zone A of the cyclic signal as shown in FIG. 10. The signal corresponding to the zone A shown in FIG. 10 will hereinafter be referred to as "first half cyclic signal".

The first half cyclic signal outputted from the first timer circuit 50 is inputted to the input port P_In of the embedded microcontroller 40 and is read by a polling operation of the embedded microcontroller 40. The polling operation of the second embodiment includes generating and output a signal that is formed by each part corresponding to the remaining half cycle in response to the first half cyclic signal inputted to the input port P_In. Namely, by the polling operation of the second embodiment, substantially a cyclic signal that is formed by each part corresponding to a half cycle in the zone B of the cyclic signal as shown in FIG. 10 is outputted. The signal corresponding to the zone B shown in FIG. 10 will hereinafter be referred to as "second half cyclic signal". Then, a transmission signal that is formed by the first half cyclic signal outputted from the first timer circuit 50 with the second half cyclic signal generated by the polling operation added thereto is outputted from the output port P_Out. The polling operation of the second embodiment will be described in detail later.

Then, rise of the second half cyclic signal is inputted to the first timer circuit 50 as the trigger. In response to the trigger, the first timer circuit 50 again outputs the H (high) signal for the time t1. In this manner, the first half cyclic signal and the second half cyclic signal are alternately outputted from the output port P_Out.

The second half cyclic signal outputted from the output port P_Out of the embedded microcontroller 40 is inputted to the second timer circuit 60 as the transmission signal, and the second timer circuit 60 obtains temporal change of the transmission signal for a time set in advance t2.

As described above, the second timer circuit 60 is formed by a retriggerable monostable multivibrator, and its function is the same as that of the second timer circuit 30 of the first embodiment. The time t2 is set to satisfy the relationship t2>2·t1 relative to the time t1 of the first half cyclic signal outputted from the first timer circuit 50 as shown in FIG. 10.

This is because that, since the time (duration) of the L (low) signal of the second half cyclic signal inputted to the second timer circuit 60 is the same as the time (duration) t1 of the H (high) signal of the first half cyclic signal, the second timer circuit 60 needs to measure the time t2 that is at least longer than a cycle 2·t1 of the transmission signal that is formed by the first half cyclic signal and the second half cyclic signal to obtain the temporal change of the transmission signal for the time t2.

Then, based on the obtained temporal change of the transmission signal, the second timer circuit 60 outputs a signal that indicates one of different operation states of the embedded microcontroller 40 depending on whether or not there is continuous temporal change of the transmission signal, similarly to the first embodiment. Specifically, if there is continuous temporal change of the transmission signal, that is, if the transmission signal corresponds to the first half cyclic signal outputted from the first timer circuit 50, it is determined that the operation of the main program of the embedded microcontroller 40 is normal, and the second timer circuit 60 of this embodiment outputs a L (low) signal. On the other hand, if there is no continuous temporal change of the transmission signal, that is, if the transmission signal does not corresponds to the first half cyclic signal, it is determined that the operation of the main program of the embedded microcontroller 40 is not normal, and the second timer circuit 60 outputs a H (high) signal.

Similarly to the first embodiment, the L signal or H signal outputted from the second timer circuit 60 is outputted to a drive control circuit (not shown in FIG. 9), which is provided separately from the embedded microcontroller 40. When the H signal is inputted to this drive control circuit, the drive control circuit suspends operation of the driving unit. This drive control circuit will be described in detail later.

As the first timer circuit 50 and the second timer circuit 60 of the drive control device of the second embodiment, a general-purpose IC chip where these two circuits are packaged may be used. An example thereof is a dual retriggerable monostable multivibrator, such as SN74LV123A available from TEXAS INSTRUMENT. Using such an IC chip contributes to reduce the circuit space.

Figure 11:
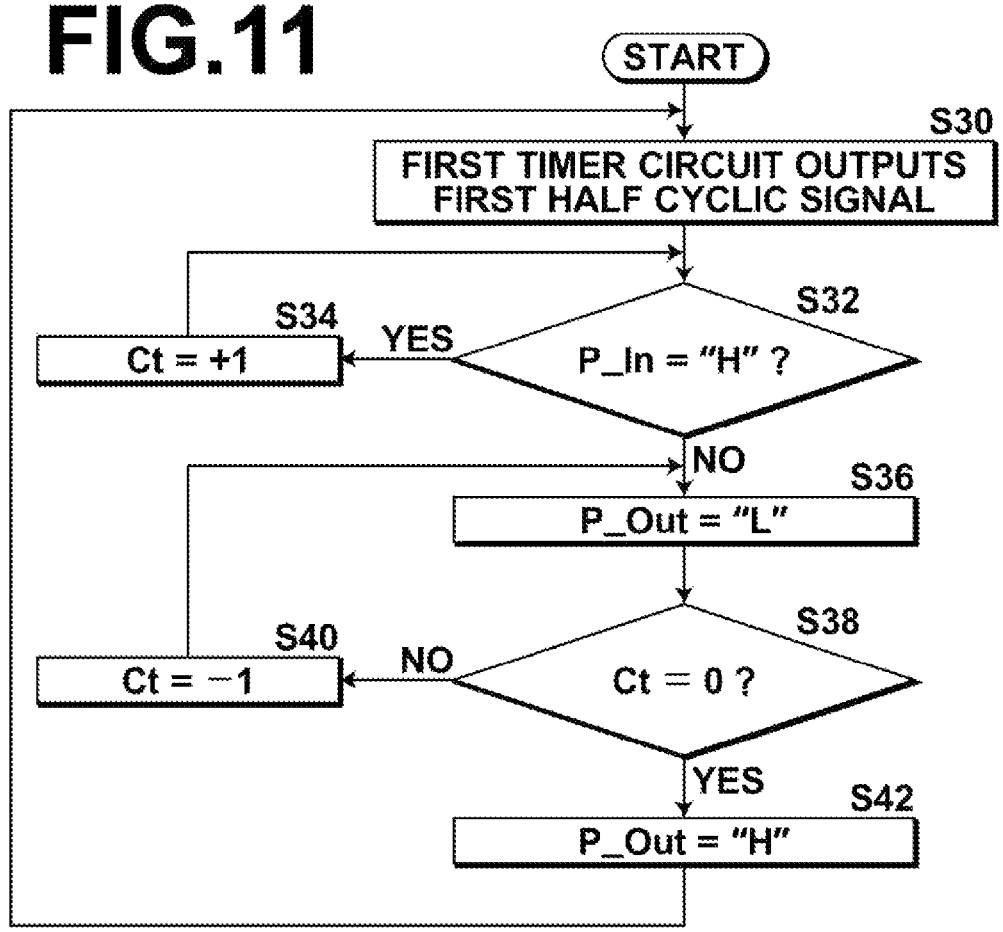
FIG. 11 is a flow chart for explaining operation of the first timer circuit and a polling operation of the embedded microcontroller of the second embodiment.

Next, operation of the drive control device of this embodiment is described. First, operation of the first timer circuit 50 and the polling operation of the embedded microcontroller 40 are described with reference to the flow chart shown in FIG. 11.

First, the first half cyclic signal as shown in FIG. 10 is outputted from the first timer circuit 50 (S30). The first half cyclic signal is outputted to the input port P_In of the embedded microcontroller 40 regardless of the operation of the main program of the embedded microcontroller 40. It should be noted that the first timer circuit 50 outputs the first half cyclic signal only when the H (high) signal is inputted thereto as a trigger input, and the H (high) signal serving as the trigger input is outputted from the output port P_Out of the embedded microcontroller 40 by the polling operation, as described above.

Then, the embedded microcontroller 40 performs the polling operation as part of operation of the main program. In the polling operation, first, whether or not the input state of the first half cyclic signal inputted to the input port P_In of the embedded microcontroller 40 is the H (high) state is checked (S32). It should be noted that the polling cycle is sufficiently shorter than the time t1 of the first half cyclic signal.

Then, if the first half cyclic signal inputted to the input port P_In is in the H (high) state, a counter Ct is incremented by one (S32: YES, and S34). These operations are repeated, and the time during which the first half cyclic signal is in the H (high) state is counted by the counter Ct.

Then, when the state of the first half cyclic signal inputted to the input port P_In is changed into the L (low) state, the output port P_Out is changed into the L (low) state (S36). Namely, output of the L (low) signal corresponding to the zone B shown in FIG. 10 is started. At this time, whether or not the count of the counter Ct is 0 is checked. If the count is not 0 (S38: NO), the current count of the counter Ct is decremented by one (S40). These operations are repeated, and the same length of time as the time during which the first half cyclic signal was in the H (high) state is counted by the counter Ct. During this counting of the time, the L (low) signal is outputted from the output port P_Out.

Then, when the count of the counter Ct becomes 0, the H (high) signal is outputted from the output port P_Out (S42).

As described above, the L (low) signal is outputted from the output port P_Out until the count of the counter Ct becomes 0, and when the count becomes 0, the H (high) signal is outputted from the output port P_Out. In this manner, the transmission signal having the cycle of the time 2·t1 formed by adding the second half cyclic signal corresponding to the zone B shown in FIG. 10 is outputted to second timer circuit 60.

The H (high) signal outputted from the output port P_Out, as described above, is also inputted to the first timer circuit 50. In response to the H (high) signal (trigger signal), the first half cyclic signal is outputted from the first timer circuit 50 again.

While the operation of the main program of the embedded microcontroller 40 is normal and the polling operation is appropriately performed, the above-described operations in S30 to S42 are repeated to alternately output the first half cyclic signal corresponding to the zone A shown in FIG. 10 and the second half cyclic signal corresponding to the zone B shown in FIG. 10.

On the other hand, when the operation of the main program of the embedded microcontroller 40 is not normal and the polling operation is not appropriately performed, the output port P_Out remains in the H (high) state or in the L (low) state.

Figure 12:
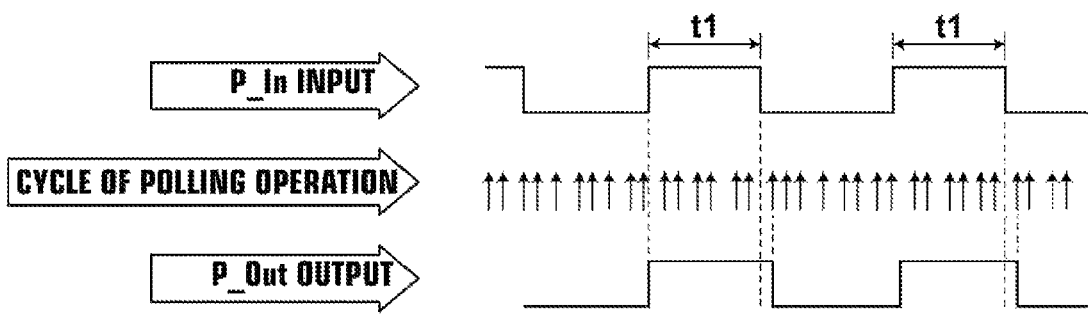
FIG. 12 is a diagram illustrating a relationship among a waveform of a signal inputted to the input port, a waveform of a signal outputted from the output port, and a cycle of the polling operation of the embedded microcontroller of the second embodiment.

FIG. 12 shows a relationship among the first half cyclic signal inputted to the input port P_In, the second half cyclic signal outputted from the output port P_Out, and the cycle of the polling operation. The cycle of the polling operation may vary depending on the length of the main program executed on the embedded microcontroller 40. The counter Ct counts a smaller number for a longer cycle of the polling operation, or counts a larger number for a shorter cycle of the polling operation. Thus, difference of the cycle of the polling operation can be accommodated by changing the number counted by the counter Ct, and variation of output timing of the second half cyclic signal from the output port P_Out can be reduced.

Figure 13:
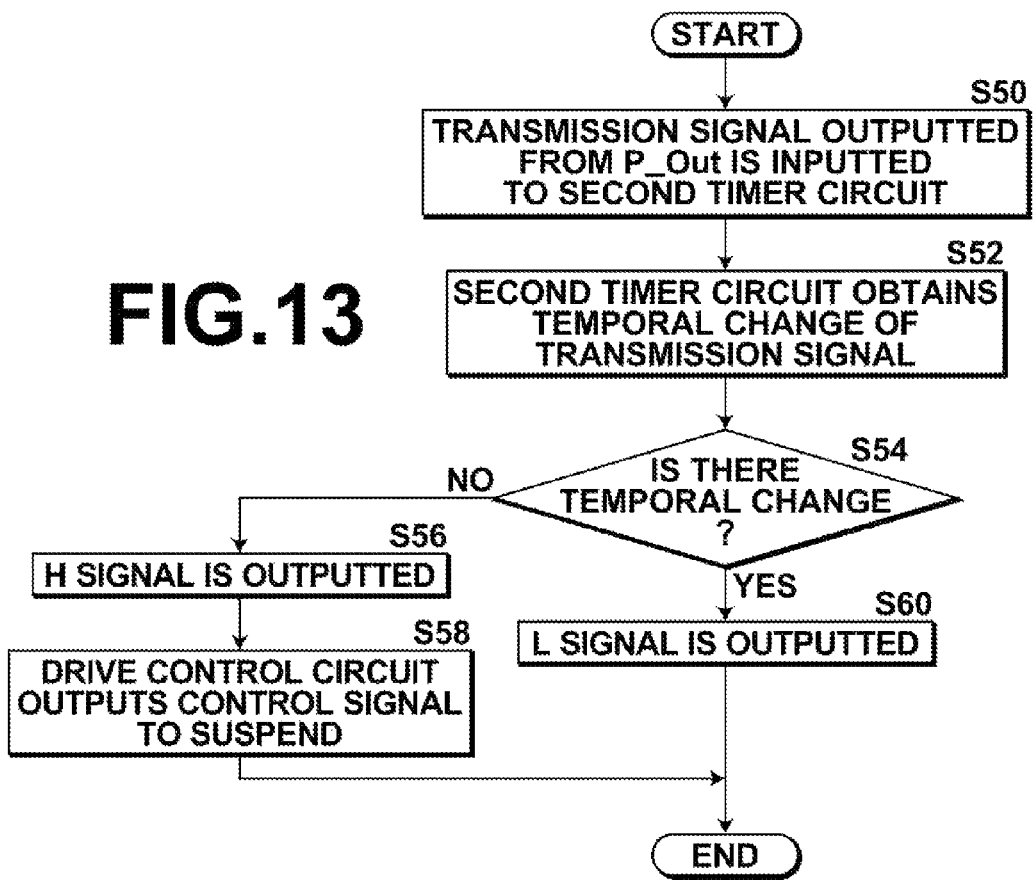
FIG. 13 is a flow chart for explaining operation of a second timer circuit of the second embodiment.

Next, operation of the second timer circuit 60 of the second embodiment is described with reference to the flow chart shown in FIG. 13. As described above, the second timer circuit 60 of the second embodiment operates in the same manner as the timer circuit 30 of the first embodiment, except the time t2 for which the temporal change of the transmission signal is measured. Therefore only the primary operation of the second timer circuit 60 is described here.

The transmission signal (the second half cyclic signal) outputted from the output port P_Out of the embedded microcontroller 40 is inputted to the second timer circuit 60 (S50). Then, the second timer circuit 60 obtains temporal change of the transmission signal for the time set in advance t2 (S52).

Then, if there is continuous temporal change of the transmission signal for the time t2, the second timer circuit 60 outputs the L (low) signal (S54: YES, and S60). That is, when the operation of the main program of the embedded microcontroller 40 is normal and the an appropriate transmission signal that corresponds to the cyclic signal outputted from the first timer circuit 50 is outputted from the output port P_Out, the second timer circuit 60 outputs the L (low) signal.

On the other hand, if there is no continuous temporal change of the transmission signal for the time t2, the second timer circuit 60 outputs the H (high) signal (S54: NO, and S56). That is, when the operation of the main program of the embedded microcontroller 40 is not normal and the output port P_Out is maintained in the H (high) state or in the L (low) state, the second timer circuit 60 outputs the H (high) signal.

Then, the H signal outputted from the second timer circuit 60 is outputted to the drive control circuit, which is provided separately from the embedded microcontroller 40. When the H signal is inputted to this drive control circuit, the drive control circuit suspends operation of the driving unit (S58).

Figure 14:
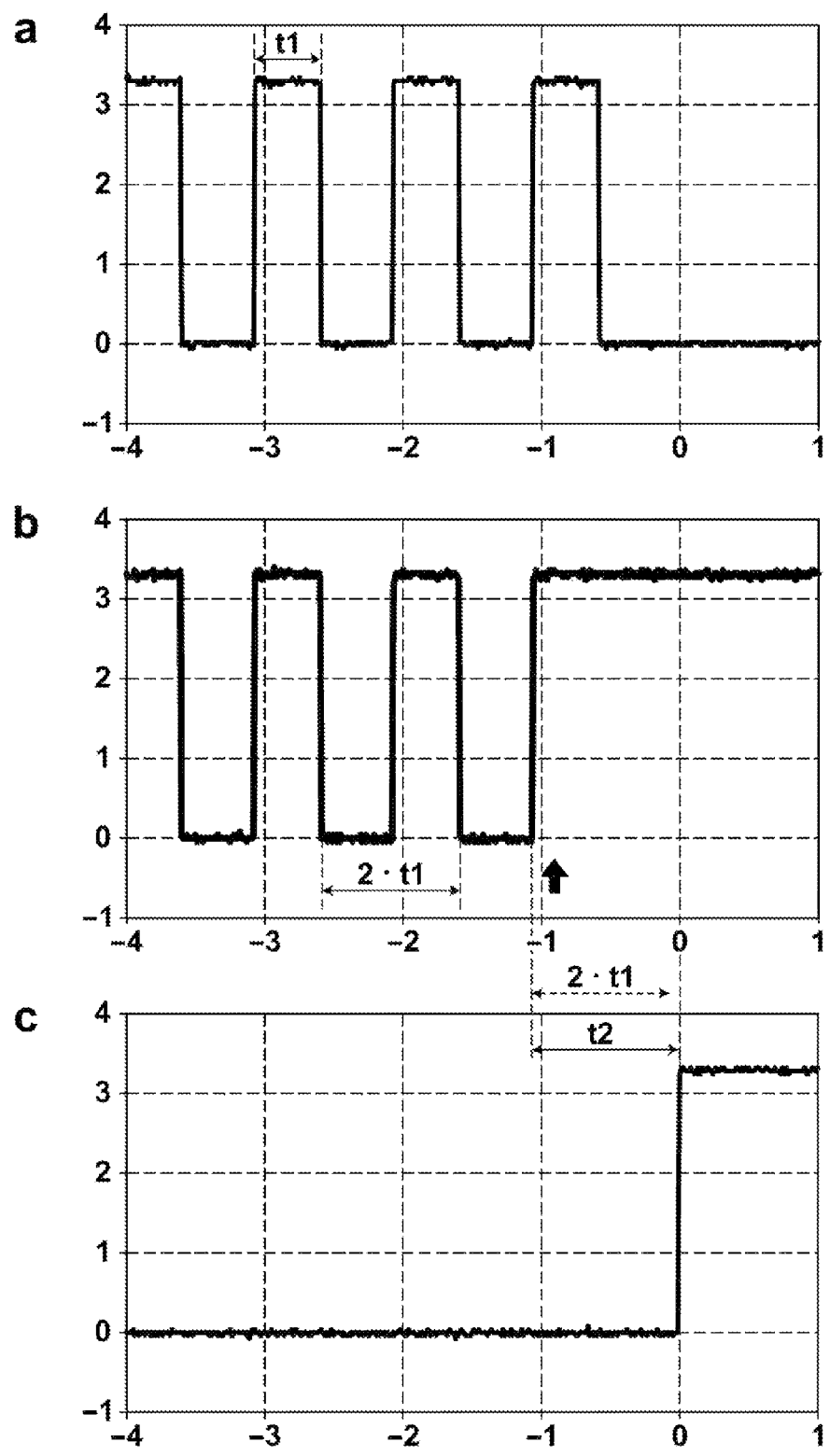
FIG. 14 illustrates one example of signal waveforms when the transmission signal is maintained in a H (high) signal state due to abnormal operation of the main program in the drive control device of the second embodiment.

FIG. 14 shows, at "a" to "c", states of signal waveforms in a case where the operation of the main program of the embedded microcontroller 40 becomes abnormal and the H (high) signal is outputted from the output port P_Out of the embedded microcontroller 40 (at a point of time indicated by the arrow shown at "b" in FIG. 14), and then the main program (the polling operation) is suspended. A signal waveform at Q1 shown in FIG. 9 is shown at "a" in FIG. 14, a signal waveform at Q2 shown in FIG. 9 is shown at "b" in FIG. 14, and a signal waveform at Q3 shown in FIG. 9 is shown at "c" in FIG. 14. As shown at "a" to "c" in FIG. 14, the H (high) signal of the microcontroller operation detection signal is outputted from the second timer circuit 60 since the output port P_Out of the embedded microcontroller 40 is maintained in the H (high) state, similarly to the above-described first embodiment.

Figure 15:
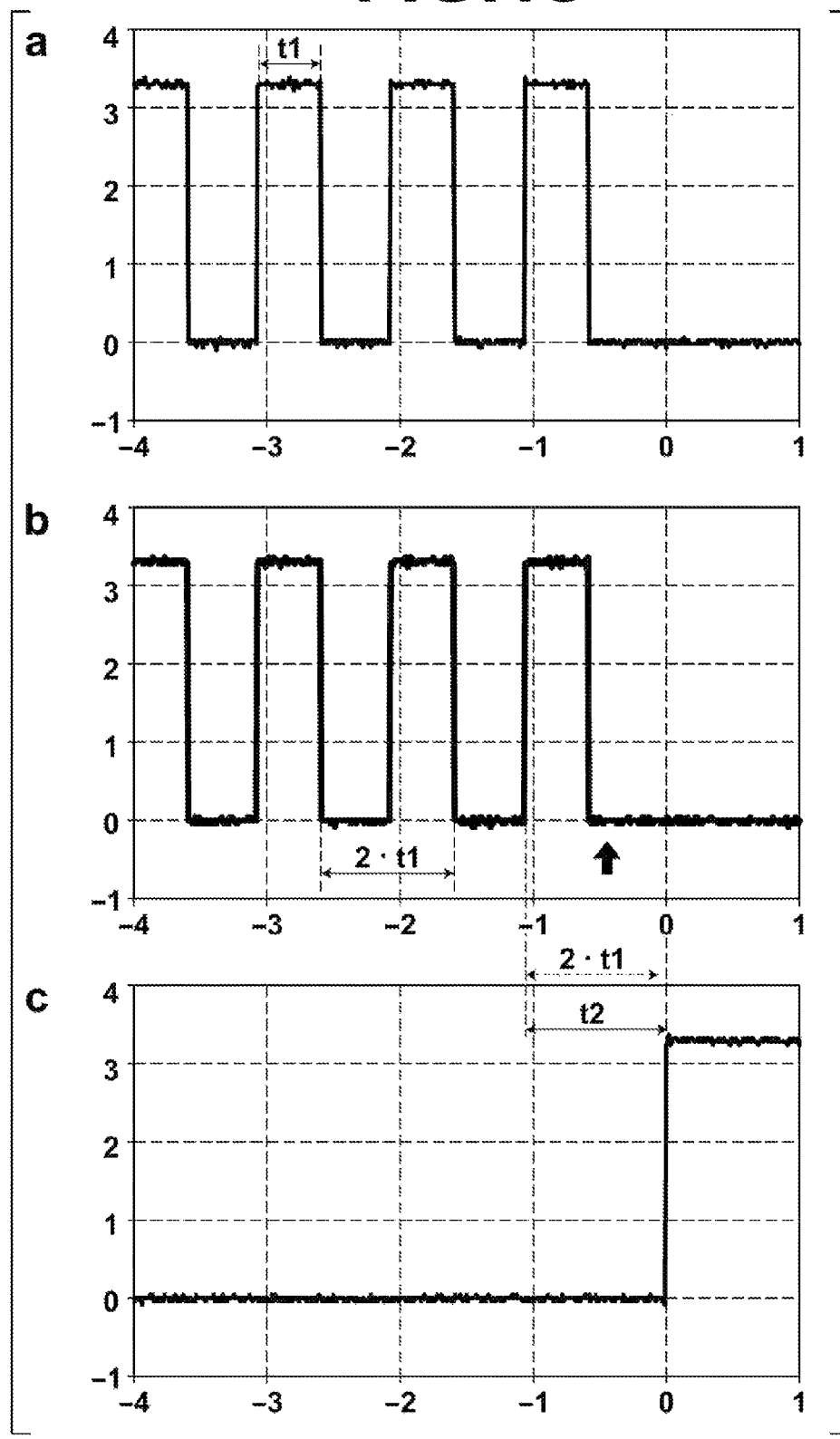
FIG. 15 illustrates one example of signal waveforms when the transmission signal is maintained in a L (low) signal state due to abnormal operation of the main program in the drive control device of the second embodiment.

FIG. 15 shows, at "a" to "c", states of signal waveforms in a case where the operation of the main program of the embedded microcontroller 40 becomes abnormal and the L (low) signal is outputted from the output port P_Out of the embedded microcontroller 40 (at a point of time indicated by the arrow shown at "b" in FIG. 15), and then the main program (the polling operation) is suspended. A signal waveform at Q1 shown in FIG. 9 is shown at "a" in FIG. 15, a signal waveform at Q2 shown in FIG. 9 is shown at "b" in FIG. 15, and a signal waveform at Q3 shown in FIG. 9 is shown at "c" in FIG. 15. As shown at "a" to "c" in FIG. 15, the H (high) signal of the microcontroller operation detection signal is outputted from the second timer circuit 60 since the output port P_Out of the embedded microcontroller 40 is maintained in the L (low) state, similarly to the first embodiment. It should be noted that, in the case of the signal waveforms as shown at "a" to "c" in FIG. 15, the H (high) signal of the microcontroller operation detection signal is outputted from the second timer circuit 60 since the state of the output port P_Out is not changed into the H (high) state during the time t2 for which the second timer circuit 60 performs the measurement.

Figure 16:
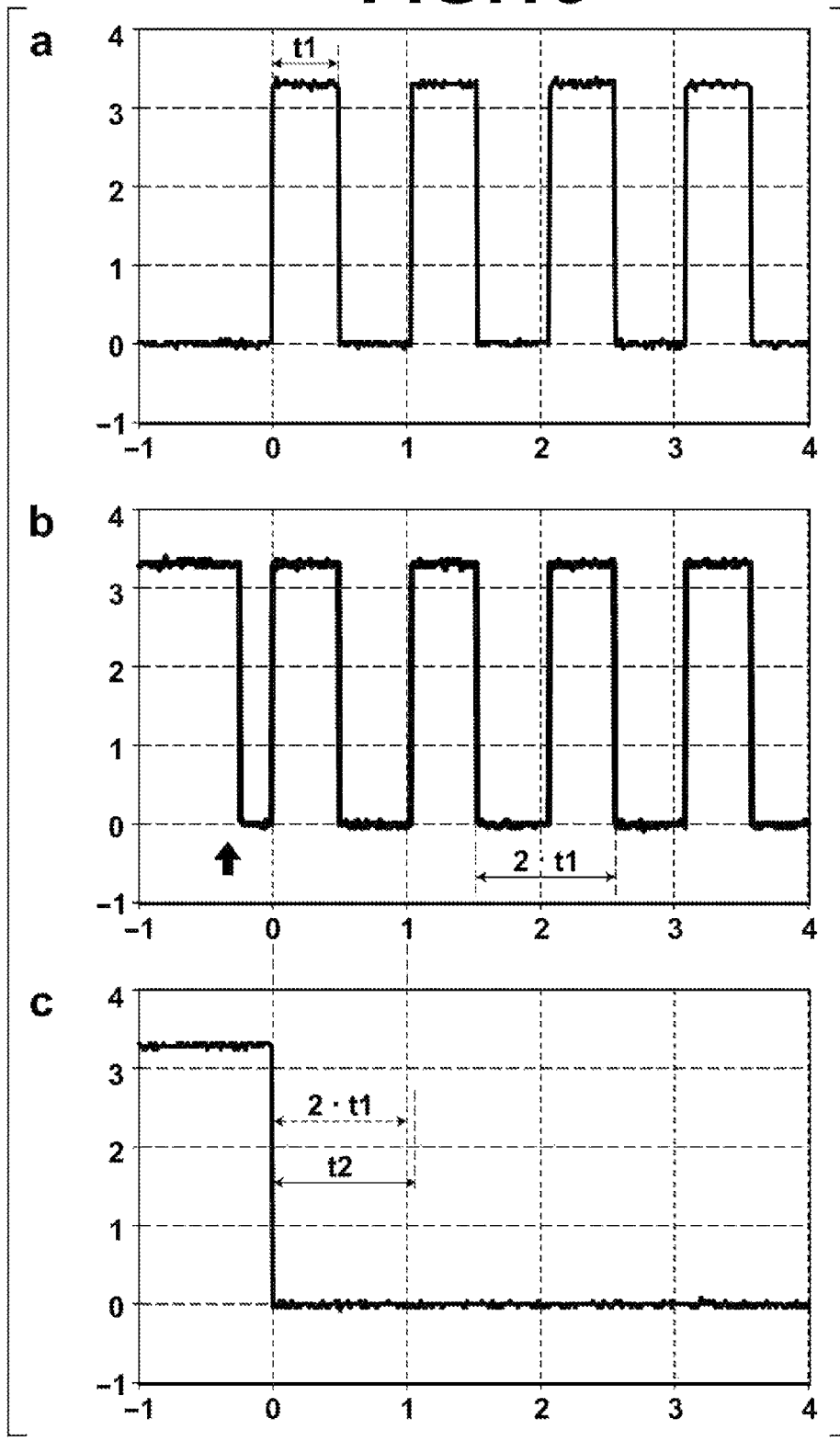
FIG. 16 illustrates one example of signal waveforms when the main program is recovered from a suspended state in the drive control device of the second embodiment.

FIG. 16 shows, at "a" to "c", states of signal waveforms at Q1 to Q3 shown in FIG. 9 in a case where the main program of the embedded microcontroller 40 is mandatorily suspended for the purpose of debug, and then the main program is recovered to the normal operation. It should be noted that the example shown at "a" to "c" in FIG. 16 is a case where the main program is mandatorily suspended before the count of the counter Ct is decremented to 0 in the polling operation of the embedded microcontroller 40.

A signal waveform at Q1 shown in FIG. 9 is shown at "a" in FIG. 16, a signal waveform at Q2 shown in FIG. 9 is shown at "b" in FIG. 16, and a signal waveform at Q3 shown in FIG. 9 is shown at "c" in FIG. 16. As shown at "b" in FIG. 16, after the main program is recovered and the decrement of the counter Ct in the polling operation is restarted and the remaining L (low) signal is outputted from the output port P_Out, the H (high) signal is outputted from the output port P_Out (at a point of time indicated by the arrow shown at "b" in FIG. 16). With this, the output of the second timer circuit 60 is changed into the L (low) state, and then the output port P_Out of the embedded microcontroller 40 is again changed into the H (high) state during the time t2 for which the measurement is performed. Therefore, the L (low) signal of the microcontroller operation detection signal is continuously outputted from the second timer circuit 60.

Figure 17:
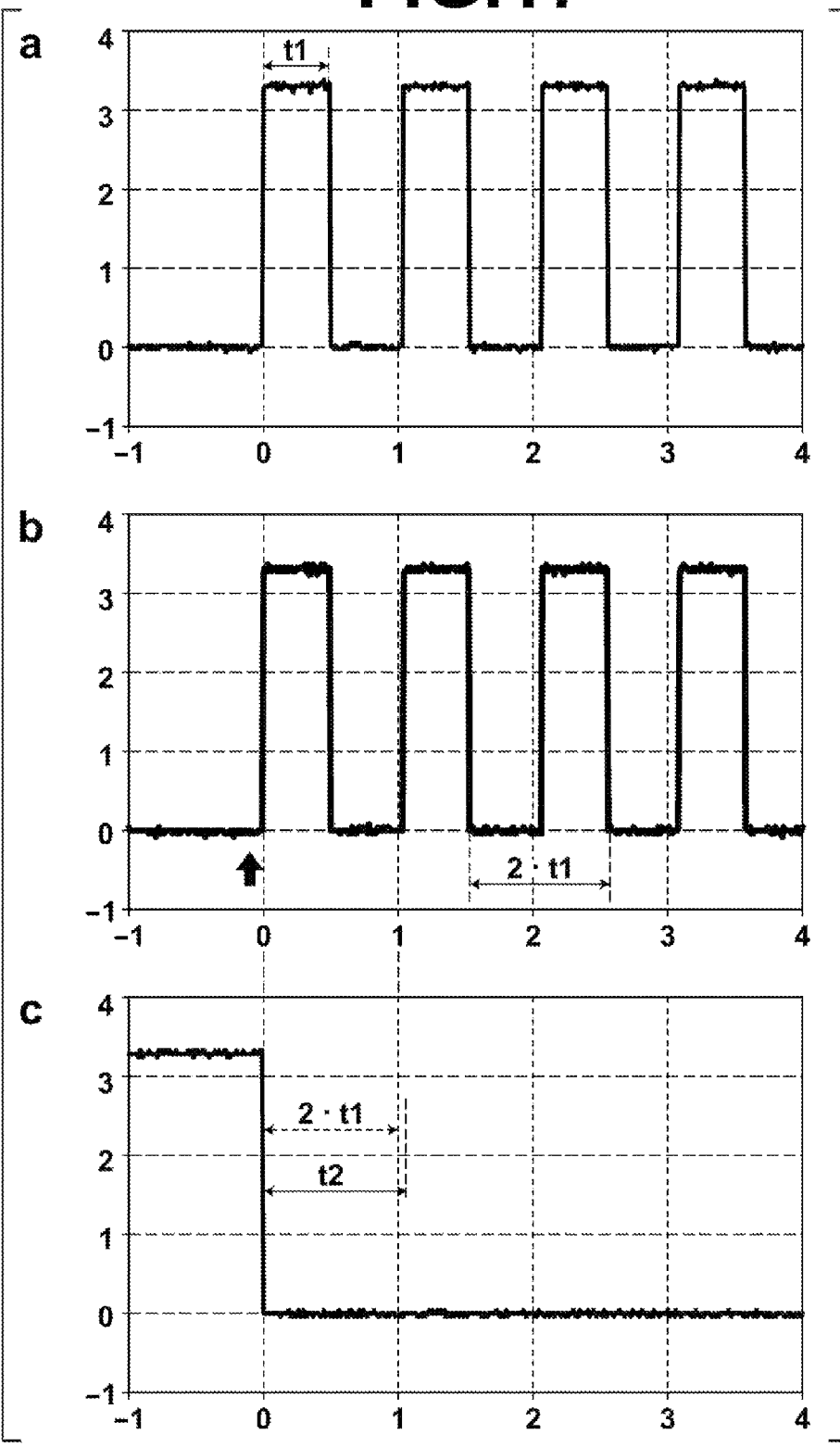
FIG. 17 illustrates one example of signal waveforms when the main program is recovered from a suspended state in the drive control device of the second embodiment.

FIG. 17 shows, at "a" to "c", states of signal waveforms at Q1 to Q3 shown in FIG. 9 in a case where the main program of the embedded microcontroller 40 is mandatorily suspended for the purpose of debug and the output port P_Out of the embedded microcontroller 40 is maintained in the L (low) state, and then the main program is recovered to the normal operation.

A signal waveform at Q1 shown in FIG. 9 is shown at "a" in FIG. 17, a signal waveform at Q2 shown in FIG. 9 is shown at "b" in FIG. 17, and a signal waveform at Q3 shown in FIG. 9 is shown at "c" in FIG. 17. As shown at "b" in FIG. 17, when the main program is recovered, the H (high) signal is outputted from the output port P_Out (at a point of time indicated by the arrow shown at "b" in FIG. 17). With this, the output of the second timer circuit 60 is changed into the L (low) state, and then the output port P_Out of the embedded microcontroller 40 is again changed into the H (high) state during the time t2 for which the measurement is performed. Therefore, the L (low) signal of the microcontroller operation detection signal is continuously outputted from the second timer circuit 60.

Next, examples where the above-described drive control device of the first embodiment or the second embodiment is used are described.

Figure 18:
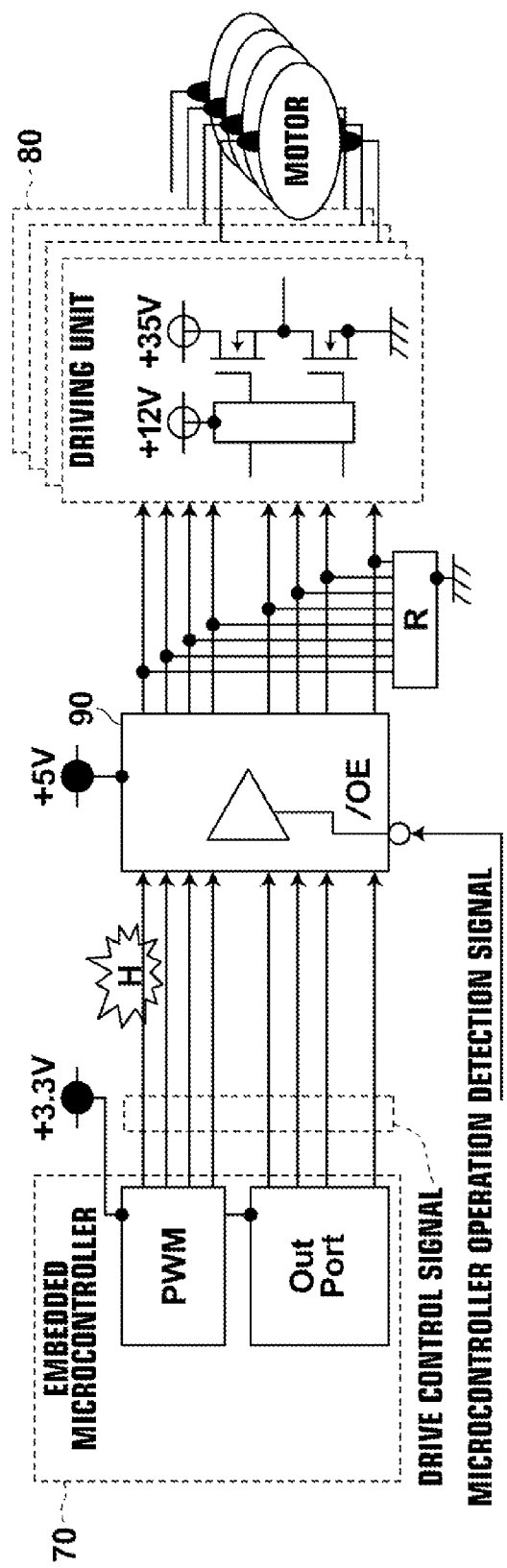
FIG. 18 is a diagram illustrating one example of a motor drive control device that performs drive control of a plurality of motors using the drive control device of the first or second embodiment of the invention.

FIG. 18 shows a motor drive control device that performs drive control of a plurality of motors using the drive control device of the above-described embodiments. It should be noted that the first and second timer circuits of the above-described embodiment are not shown in FIG. 18, and only a position where the microcontroller operation detection signal (the H (high) signal or the L (low) signal) outputted from the second timer circuit is inputted is shown.

An embedded microcontroller 70 of the motor drive control device shown in FIG. 18 corresponds to the embedded microcontroller 10 or 40 of the above-described embodiments. Drive control of motors of a driving unit 80 is performed by operation of the main program of the embedded microcontroller 70. A tolerant buffer device 90 is provided between the embedded microcontroller 70 and the driving unit 80 including the motors. The tolerant buffer device 90 is a device for adjusting a voltage level supplied to the driving unit 80. In the motor drive control device shown in FIG. 18, the tolerant buffer device 90 corresponds to the above-described drive control circuit, which is provided separately from the embedded microcontroller 70.

In the motor drive control device shown in FIG. 18, when operation of the main program of the embedded microcontroller 70 is not normal and an abnormal control signal is outputted from the embedded microcontroller 70, the H (high) signal of the microcontroller operation detection signal outputted from the second timer circuit is inputted the tolerant buffer device 90. In response to the inputted microcontroller operation detection signal, the tolerant buffer device 90 suspends the voltage supply to the driving unit 80. In this manner, operation of the driving unit 80 can appropriately be suspended.

Figure 19:
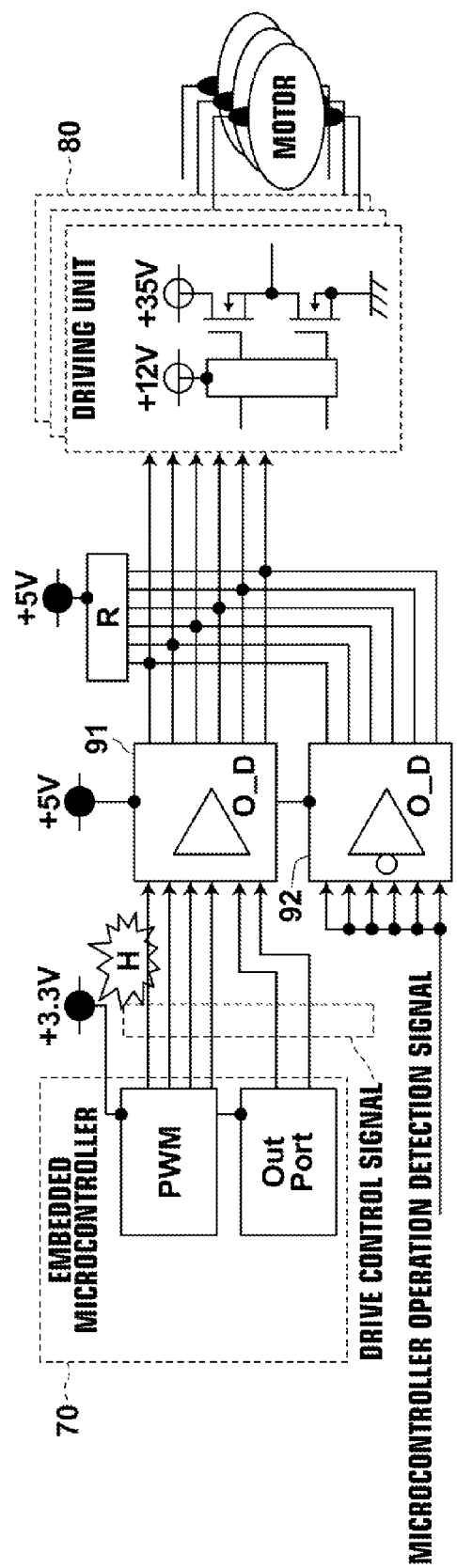
FIG. 19 is a diagram illustrating another example of the motor drive control device that performs drive control of a plurality of motors using the drive control device of the first or second embodiment of the invention.

A motor drive control device shown in FIG. 19 uses open-drain devices 91 and 92 as the tolerant buffer device 90 shown in FIG. 18. In the motor drive control device shown in FIG. 19, when operation of the main program of the embedded microcontroller 70 is not normal and an abnormal control signal is outputted from the embedded microcontroller 70, the H (high) signal of the microcontroller operation detection signal outputted from the second timer circuit is inputted to the open-drain device 92. In response to the inputted operation detection signal, the open-drain device 92 suspends voltage supply from the open-drain device 91 to the driving unit 80. In this manner, operation of the driving unit 80 can appropriately be suspended.

The drive control device of each of the above-described embodiments is adapted such that, when the embedded microcontroller becomes unable to output a normal control signal due to suspension, or the like, of the main program in a state where each control signal is active, the first timer circuit and the second timer circuit detect this abnormality and the driving unit is suspended in response to the detection of abnormality, thereby bringing the driving unit into a safe state. That is, a multiple safety ensuring function is provided by detecting a software failure of the embedded microcontroller with a hardware device (the first and the second timer circuits) that is provided separately from the embedded microcontroller. Therefore, safety cannot be ensured only when a software failure of the embedded microcontroller and a failure of the hardware device that is provided externally to the embedded microcontroller occur at the same time.

However, even when the operation of the main program of the embedded microcontroller is normal, a failure of an output port from which the control signal is outputted, a failure a device inserted in a control signal line or disconnection of the control signal line may occur, for example, and operation of the control system itself may become abnormal. An example of such a situation is a case where disconnection occurs at the position of the star-like mark shown in FIG. 18 and FIG. 19.

Figure 22:
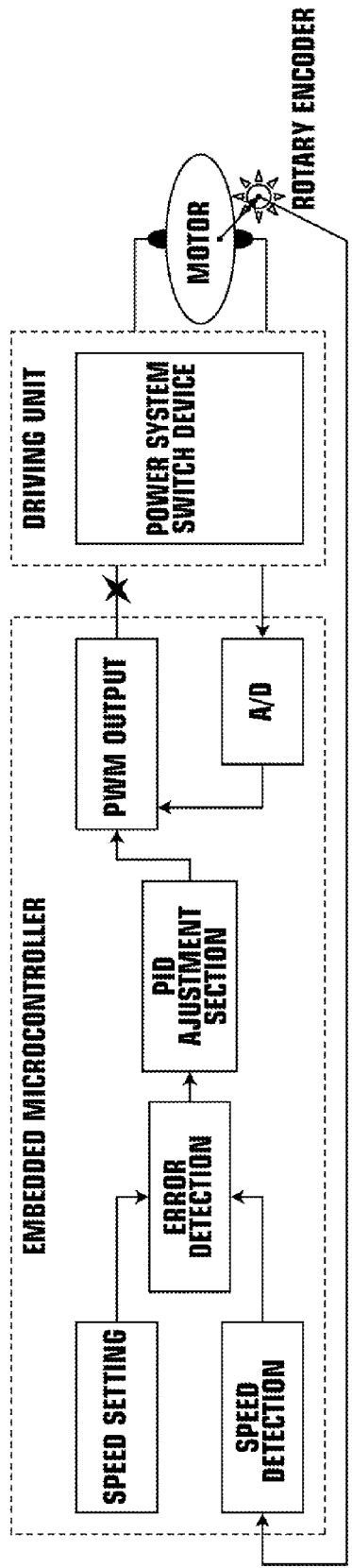
FIG. 22 is a diagram illustrating one example of a feedback loop-type motor rotational speed control system that performs so-called PID control.
Figure 23:
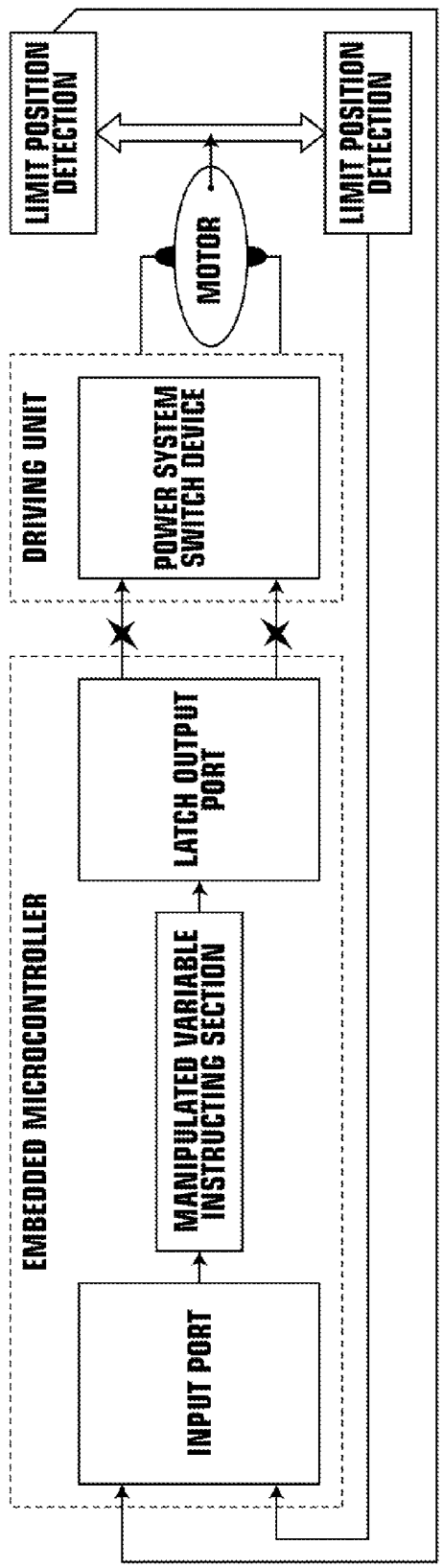
FIG. 23 is a diagram illustrating one example of a drive control system that makes a reciprocating motion within a limit position range.
Figure 24:
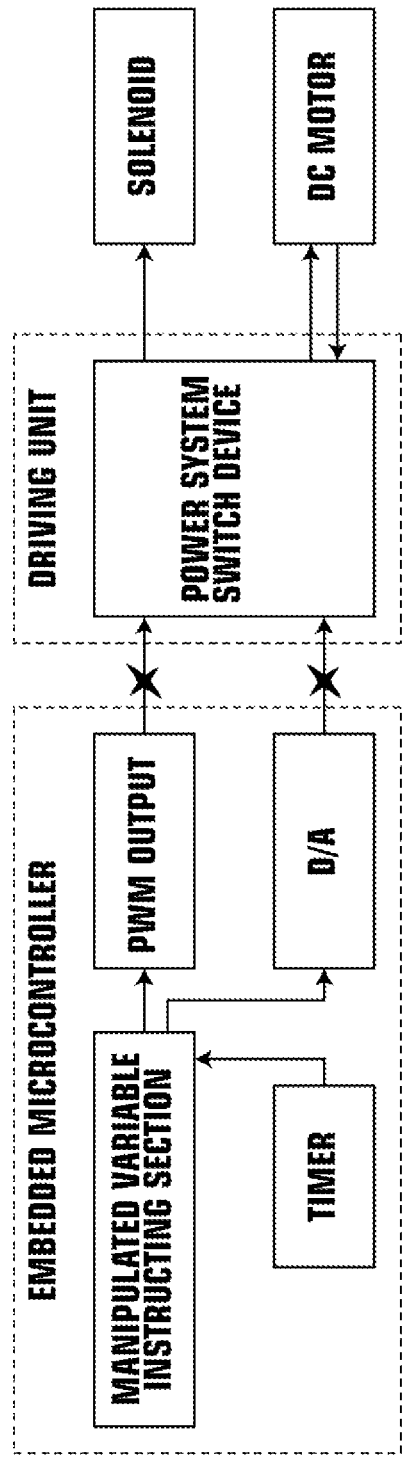
FIG. 24 is a diagram illustrating one example of a control system that performs open-loop constant current control of a solenoid and a DC motor.
Figure 25:
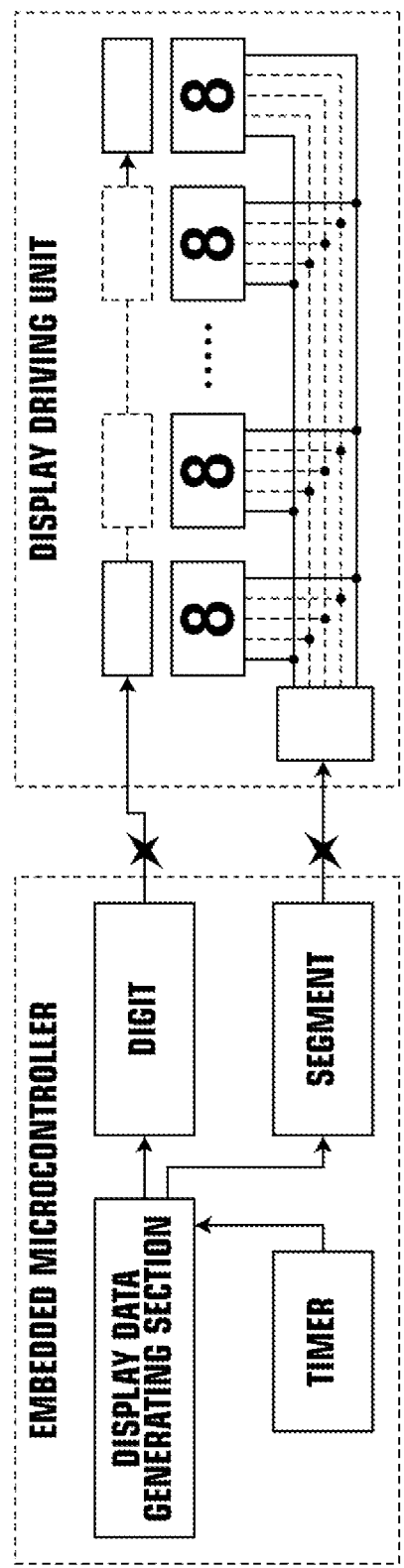
FIG. 25 is a diagram illustrating one example of a control system that performs dynamic scanning display drive.

In a case where a rotational speed control loop shown in FIG. 22 or a control loop of a reciprocating motion system shown in FIG. 23, for example, is formed as the drive control device, a rotary encoder or a control position detection unit is included in the control loop. Therefore, in the case of disconnection of the control signal line, or the like, as described above, although abnormal operation can be detected by detecting the rotational speed or the control position, abnormal operation cannot be avoided.

To address this problem, the drive control devices of the first and second embodiments may be configured to be able to avoid abnormal operation of the control system.

Specifically, when an abnormal rotational speed is detected in the rotational speed control loop or an abnormal control position is detected in the control loop of the reciprocating motion system, as described above, a flag may be set (i.e., Flag=1) as part of operation of the main program, and the state of the Flag may be referenced during the polling operation to output the transmission signal to the second timer circuit.

Figure 20:
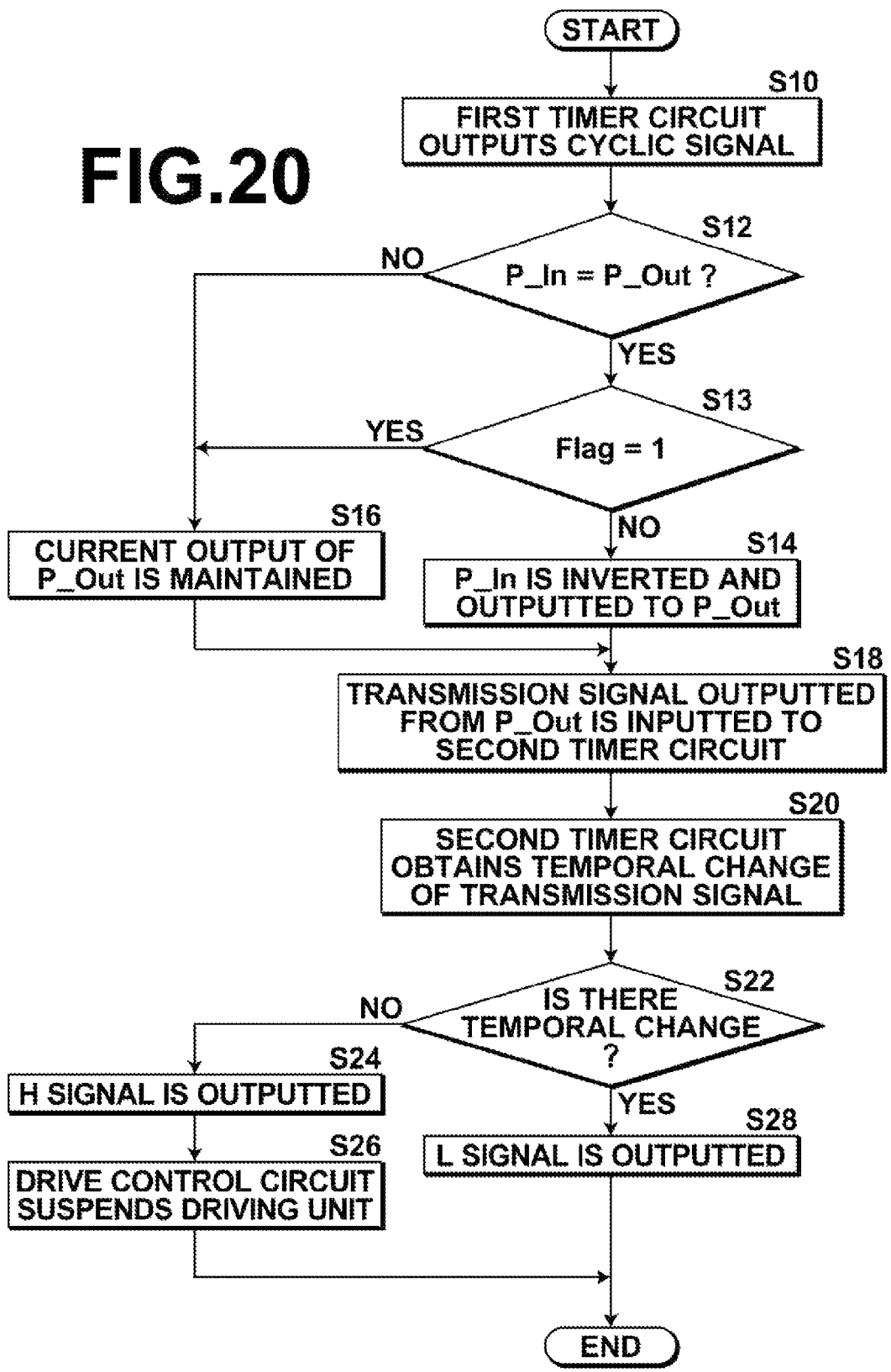
FIG. 20 is a flow chart for explaining operation of a modification of the drive control device of the first embodiment.

For example, in the case of the drive control device of the first embodiment as shown in the flow chart shown in FIG. 20, if the state of the input port P_In is the same as the state of the output port P_Out as a result of the comparison between them in S12, then the state of the Flag may be checked. If no Flag is set (S13: NO), a toggled output may be provided from the P_Out as normal operation. If the Flag is set (S13: YES), the current output state of the P_Out may be maintained. Thus, when the Flag is set, the H signal of the microcontroller operation detection signal is outputted from the second timer circuit 30 to suspend the driving unit.

Figure 21:
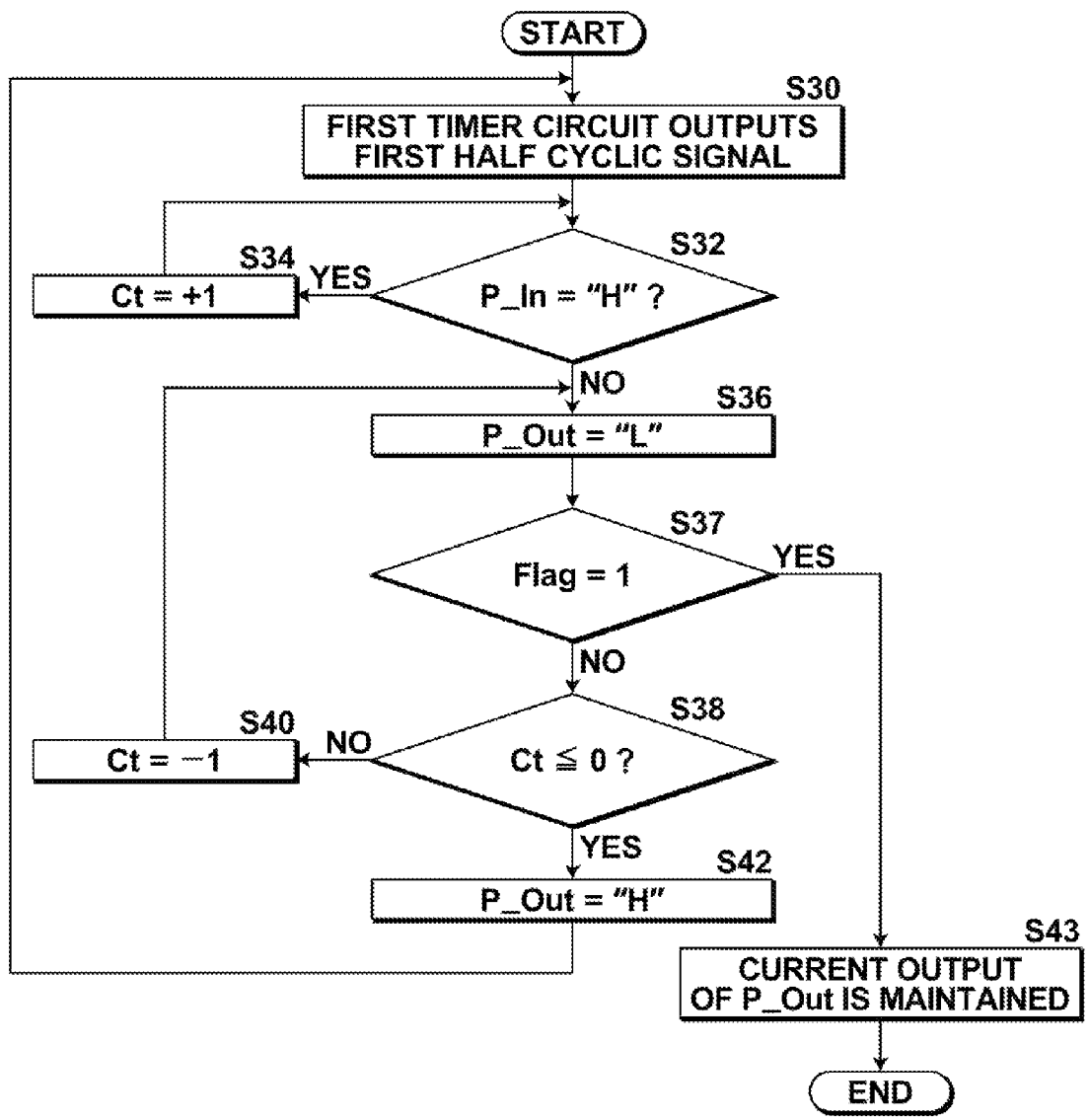
FIG. 21 is a flow chart for explaining operation of a modification of the drive control device of the second embodiment.

In the case of the drive control device of the second embodiment as shown in the flow chart shown in FIG. 21, after the state of the output port P_Out is changed into the L (low) state in S36, the state of the Flag may be checked. If no Flag is set (S37: NO), the L (low) signal may be outputted for a time corresponding to the count of the counter Ct as normal operation, and then the state of the output port P_Out may be changed into the H (high) state. If the Flag is set (S37: YES), the current output state of the P_Out may be maintained (S43). In this manner, when the Flag is set, the H signal of the microcontroller operation detection signal is outputted from the second timer circuit 30 to suspend the driving unit.

In the above description, the Flag is set based on detection of abnormality in the rotational speed in the case where the rotational speed control loop is formed or detection of abnormality in the control position in the case where the control loop of the reciprocating motion system is formed. Now, how abnormality is detected in each of the cases is described in more detail, and abnormality detection in other control systems is described.

First, the case of the feedback loop-type speed control system including a rotational speed detector, such as a rotary encoder, as shown in FIG. 22 is described. In the case of this type of speed control system, a speed limit range is set based on a pattern of control speed set in advance, and an electric current limit range is set based on acceleration and load torque.

Since the actual speed and the actual electric current are calculated in the drive control by the main program of the embedded microcontroller, the actual speed is compared with the speed limit range and the actual electric current is compared with electric current limit range. Then, if at least one of these values has exceeded the limit range, a flag may be set (i.e., Flag=1). In this manner, detection of a completely locked state of motor speed, an abnormal rotation operation due to overload or no-load, a failure of the rotary encoder, disconnection of the control signal line, etc., can be achieved.

Next, the case of the mechanical control system of the reciprocating motion system as shown in FIG. 23, where the mechanical control system includes a limit position detection unit, is described. In this type of mechanical control system, a control position range of the reciprocating motion is set. If the reciprocating motion has exceeded the control position range, the fact is detected by the limit position detection unit, and mechanical control is exerted to return the reciprocating motion to be within the limit position range. Therefore, a time taken for the reciprocating object to travel from one limit position to the other limit position may be measured, and a flag may be set (i.e., Flag=1) if the measured time has exceeded a time set in advance. In this manner, detection of mechanical lock, abnormality in the traveling speed, abnormality in the limit position detector, disconnection of the control signal line, etc., can be achieved.

In a case of a control system that performs temperature control of a heater, a heat radiator, or the like, if a feedback path from a temperature detector, or the like, is provided, a flag may be set (i.e., Flag=1) if abnormality is detected by a learning-type time-combined control. The learning-type time-combined control refers to a method including converting a difference between a current temperature and a target temperature into a time, supplying power for the converted time, then measuring the temperature, comparing the measured temperature with learning data that is set in advance, and detecting abnormality if the difference is greater than a predetermined value.

In a case of a control system that controls a pump for pumping a liquid, such as ink, if a feedback path from a liquid level position detector, or the like, is provided, a flag may be set (i.e., Flag=1) if abnormality is detected by the above-described learning-type time-combined control. Namely, a difference between a current liquid level position and a target liquid level position is converted into a time, power is supplied for the converted time, then the liquid level position is measured, the measured liquid level position is compared with learning data that is set in advance, and abnormality is detected and the flag is set (i.e., Flag=1) if the difference is greater than a predetermined value.

What is claimed is:

1. A drive control device comprising:
an embedded microcontroller including a program for outputting a drive control signal to a driving unit that drives a given apparatus;
a first timer circuit provided externally to the embedded microcontroller, the first timer circuit outputting a cyclic signal to the embedded microcontroller, wherein the embedded microcontroller reads the cyclic signal outputted from the first timer circuit and transmits the cyclic signal to output a transmission signal as part of operation of the program; and
a second timer circuit provided externally to the embedded microcontroller, wherein the transmission signal is inputted to the second timer circuit, the second timer circuit obtains temporal change of the transmission signal for a time set in advance, and the second timer circuit outputs, based on the obtained result, a signal indicating one of different operation states of the embedded microcontroller depending on whether or not there is continuous temporal change of the transmission signal.

2. The drive control device as claimed in claim 1, wherein the embedded microcontroller reads the cyclic signal by performing a polling operation as part of operation of the program.

3. The drive control device as claimed in claim 1, wherein the embedded microcontroller includes, separately from said program, an abnormality detection program for detecting abnormal operation of the driving unit, and,
if abnormal operation is detected by the abnormality detection program, the embedded microcontroller outputs, to the second timer circuit, a signal that maintains an input state of the second timer circuit.

4. A drive control device comprising:
an embedded microcontroller including a program for outputting a drive control signal to a driving unit that drives a given apparatus;
a first timer circuit provided externally to the embedded microcontroller, the first timer circuit outputting a cyclic signal to the embedded microcontroller, wherein the embedded microcontroller reads the cyclic signal outputted from the first timer circuit and transmits the cyclic signal to output a transmission signal as part of operation of the program; and
a second timer circuit provided externally to the embedded microcontroller, wherein the transmission signal is inputted to the second timer circuit, the second timer circuit obtains temporal change of the transmission signal for a time set in advance, and the second timer circuit outputs, based on the obtained result, a signal indicating one of different operation states of the embedded microcontroller depending on whether or not there is continuous temporal change of the transmission signal,
wherein the first timer circuit comprises a rectangular wave oscillator and outputs a rectangular wave signal that is outputted from the rectangular wave oscillator as the cyclic signal, and
the embedded microcontroller outputs the transmission signal by providing a toggled output of the cyclic signal that is the rectangular wave signal as part of operation of the program.

5. The drive control device as claimed in claim 4, wherein a cycle T1 of the cyclic signal outputted from the first timer circuit and the time set in advance T2 at the second timer circuit satisfy the relationship T2>T1.

6. A drive control device comprising:
an embedded microcontroller including a program for outputting a drive control signal to a driving unit that drives a given apparatus;
a first timer circuit provided externally to the embedded microcontroller, the first timer circuit outputting a cyclic signal to the embedded microcontroller, wherein the embedded microcontroller reads the cyclic signal outputted from the first timer circuit and transmits the cyclic signal to output a transmission signal as part of operation of the program; and
a second timer circuit provided externally to the embedded microcontroller, wherein the transmission signal is inputted to the second timer circuit, the second timer circuit obtains temporal change of the transmission signal for a time set in advance, and the second timer circuit outputs, based on the obtained result, a signal indicating one of different operation states of the embedded microcontroller depending on whether or not there is continuous temporal change of the transmission signal,
wherein the first timer circuit outputs, as the cyclic signal, a signal of a given logic level for a time t1 from a point of time at which a trigger signal is inputted,
the embedded microcontroller measures the time t1 from a start of reading of the cyclic signal with a counter, and, at a point of time at which a counter number resulting from the measurement has been counted after elapse of the time t1, the embedded microcontroller outputs, as the transmission signal, a signal of a given logic level to the second timer circuit and outputs the signal of the given logic level as the trigger signal to the first timer circuit as part of operation of the program.

7. The drive control device as claimed in claim 6, wherein the time t1 for which the signal of the given logic level is outputted from the first timer circuit and the time set in advance t2 at the second timer circuit satisfy the relationship t2>2×t1.

\* \* \* \* \*